US006826332B2

(12) United States Patent
Saito et al.

(10) Patent No.: US 6,826,332 B2
(45) Date of Patent: Nov. 30, 2004

(54) ARRAYED WAVEGUIDE GRATING AND ITS METHOD FOR CORRECTING CENTER WAVELENGTH

(75) Inventors: Tsunetoshi Saito, Chyioda-ku (JP); Kazuhisa Kashihara, Chiyoda-ku (JP); Kanji Tanaka, Chiyoda-ku (JP); Junichi Hasegawa, Chiyoda-ku (JP); Yoshinobu Nekado, Chiyoda-ku (JP); Yoshimi Ono, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/127,406

(22) Filed: Apr. 23, 2002

(65) Prior Publication Data

US 2002/0181871 A1 Dec. 5, 2002

Related U.S. Application Data

(63) Continuation of application No. PCT/JP01/08944, filed on Oct. 11, 2001.

(30) Foreign Application Priority Data

Oct. 13, 2000 (JP) ........................................ 2000-313620
Sep. 18, 2001 (JP) ........................................ 2001-283577

(51) Int. Cl.[7] .............................. G02B 6/34; G02B 6/12
(52) U.S. Cl. ............................ 385/37; 385/39; 385/46; 385/14
(58) Field of Search ............................ 385/37–39, 24, 385/14–15, 46–47, 129–131

(56) References Cited

U.S. PATENT DOCUMENTS 5,905,824 A * 5/1999 Delisle et al. ................. 385/15
6,222,963 B1 * 4/2001 Grand et al. ................... 385/39
6,304,687 B1 * 10/2001 Inoue et al. .................... 385/14
6,377,723 B1   4/2002 Saito et al.
6,456,763 B2 * 9/2002 Kashihara et al. ............. 385/37
6,490,395 B1 * 12/2002 Nara et al. ..................... 385/39
6,522,809 B1 * 2/2003 Takabayashi et al. ......... 385/37
6,549,696 B1 * 4/2003 Uetsuka et al. ................ 385/24

FOREIGN PATENT DOCUMENTS

| EP | 0 919 840 | 6/1999 |
| JP | 11-218639 | 8/1999 |
| JP | 2000-241656 | 9/2000 |
| JP | 2001-255431 | 9/2001 |
| JP | 2001-290038 | 10/2001 |
| WO | WO98/36299 | 8/1998 |

OTHER PUBLICATIONS

U.S. patent application Ser. No. 10/127,406, Saito et al., filed Apr. 23, 2002.
U.S. patent application Ser. No. 10/703,608, Kashihara et al., filed Nov. 10, 2003.

* cited by examiner

*Primary Examiner*—Nimeshkumar D. Patel
*Assistant Examiner*—Dalei Dong
(74) *Attorney, Agent, or Firm*—Oblon, Spivak, McClelland, Maier & Neustadt, P.C.

(57) ABSTRACT

At least one of two slab waveguides constituting an arrayed waveguide grating is cut and separated together with a substrate on a cross separating face. A slide moving member is arranged over a waveguide forming area formed on the substrate including the separating slab waveguide and a waveguide forming area formed on the substrate including the separating slab waveguide. Temperature dependence of the center wavelength of the arrayed waveguide grating is reduced by slide-moving the separating slab waveguide by the slide moving member along the cross separating face dependently on temperature. The shift of an initial center wavelength is corrected by plastically deforming the slide moving member so that the initial center wavelength is conformed to a grid wavelength.

11 Claims, 15 Drawing Sheets

ARRAYED WAVEGUIDE GRATING AND ITS METHOD FOR CORRECTING CENTER WAVELENGTH

This application is a continuation of PCT/JP01/08944 filed Oct. 11, 2001.

TECHNICAL FIELD

The present invention relates to an arrayed waveguide grating used as a wavelength division multiplexer/demultiplexer in optical communications, and method for correcting center wavelength.

BACKGROUND OF THE INVENTION

In recent optical communications, wavelength division multiplexing communications are vigorously researched and developed and its practical use is advanced as a method for greatly increasing transmission capacity of the optical communications. In the wavelength division multiplexing communications, for example, a plurality of lights having wavelengths different from each other are multiplexed and transmitted. In such wavelength division multiplexing communications, a light transmitting device which transmits only the predetermined wavelengths is indispensable.

FIG. 11 shows one example of the light transmitting device. This light transmitting device is an arrayed waveguide grating (AWG) of a planar lightwave circuit (PLC). The arrayed waveguide grating includes a waveguide forming area having a waveguide construction formed on a silicon substrate 1 as shown in FIG. 11.

The waveguide construction of the arrayed waveguide grating comprises at least one optical input waveguide 2 and a first slab waveguide 3 connected to an emitting side of at least one optical input waveguide 2. An arrayed waveguide 4 constructed by a plurality of channel waveguides 4a arranged side by side is connected to an emitting side of the first slab waveguide 3. A second slab waveguide 5 is connected to an emitting side of the arrayed waveguide 4. A plurality of optical output waveguides 6 arranged side by side are connected to an emitting side of the second slab waveguide 5.

The above arrayed waveguide 4 propagates light transmitted from the first slab waveguide 3. Lengths of the adjacent channel waveguides 4a are different by ΔL from each other. For example, the optical output waveguides 6 are arranged in accordance with the number of signal lights of wavelengths different from each other. A plurality of channel waveguides 4a such as 100 channel waveguides 4a are normally arranged. However, in FIG. 11, the number of optical output waveguides 6, the number of channel waveguides 4a and the number of optical input waveguides 2 are respectively schematically shown to simplify FIG. 11.

For example, an unillustrated optical fiber is connected to the optical input waveguide 2 so as to introduce the wavelength multiplexed light. The wavelength multiplexed light is transmitted to the first slab waveguide 3 through one of the optical input waveguides 2. The wavelength multiplexed light transmitted to the first slab waveguide 3 is widened by a diffraction effect, and is transmitted to the arrayed waveguide 4, and is propagated in the arrayed waveguide 4.

The light propagated in the arrayed waveguide 4 reaches the second slab waveguide 5, and the lights are condensed each other and outputted to each of optical output waveguide 6. However, since the lengths of the adjacent channel waveguides 4a of the arrayed waveguide 4 are different from each other, a phase shift is caused for the individual light after the light is propagated in the arrayed waveguide 4. A phasefront of the condensed light is inclined in accordance with this shift amount, and a condensing position is determined by an angle of this inclination.

Therefore, the condensing positions of the lights of different wavelengths are different from each other. The lights (demultiplexed lights) of different wavelengths can be outputted from the different optical output waveguides 6 every wavelength by forming the optical output waveguides 6 in the respective light condensing positions.

Namely, the arrayed waveguide grating has an optical demultiplexing function for demultiplexing from the multiplexed light, having wavelengths different from each other. A center wavelength of the demultiplexed light is proportional to the difference (ΔL) between the lengths of the adjacent channel waveguides 4a of the arrayed waveguide 4 and an effective refractive index (equivalent refractive index) n of the arrayed waveguide 4.

The arrayed waveguide grating satisfies the relation of (formula 1).

$$n_s \cdot d \cdot \sin \phi + n_c \cdot \Delta L = m \cdot \lambda \quad \text{(formula 1)}$$

Here, $n_s$ is an equivalent refractive index of each of the first slab waveguide and the second slab waveguide, and $n_c$ is an equivalent refractive index of the arrayed waveguide. Further, $\phi$ is a diffraction angle, m is a diffraction order, d is the distance between the adjacent channel waveguides 4a at the end of the arrayed waveguide 4, and λ is a center wavelength of light outputted from each optical output waveguide.

Here, when the center wavelength at the diffraction angle $\phi=0$ is set to $\lambda_0$, $\lambda_0$ is represented by (formula 2). The wavelength $\lambda_0$ is generally called a center wavelength of the arrayed waveguide grating.

$$\lambda_0 = \frac{n_c \cdot \Delta L}{m} \quad \text{(Formula 2)}$$

Since the arrayed waveguide grating has the above characteristics, the arrayed waveguide grating can be used as a wavelength multiplexer/demultiplexer for the wavelength multiplexing transmission.

For example, as shown in FIG. 11, when a multiplexed light of wavelengths λ1, λ2, λ3, - - - , λn (n is an integer not less than 2) is inputted from one of the optical input waveguides 2, the light having the different wavelengths is widened in the first slab waveguide 3 and reach the arrayed waveguide 4. Thereafter, the lights of the respective wavelengths are condensed to different positions in accordance with the wavelengths as mentioned above through the second slab waveguide 5. The lights of the respective wavelengths are transmitted to the optical output waveguides 6 different from each other, and are outputted from emitting ends of the optical output waveguides 6 through the respective optical output waveguides 6.

The above light of each wavelength is taken out through an unillustrated optical fiber for an optical output by connecting this optical fiber to the emitting end of each optical output waveguide 6. When the optical fiber is connected to each optical output waveguide 6 and the above optical input waveguide 2, for example, an optical fiber array fixedly arranging a connecting end face of the optical fiber in a one-dimensional array shape is prepared. The optical fiber arrays are fixed to connecting end face sides of the optical output waveguides 6 and the optical input waveguides 2, and then the optical fibers, the optical output waveguides 6 and the optical input waveguides 2 are connected.

In the above arrayed waveguide grating, transmittion characteristics of the light outputted from each optical output waveguide 6, i.e., the wavelength dependency of transmitted light intensity of the arrayed waveguide grating are provided as shown in FIG. 12A. As shown in FIG. 12A, in the light transmitting characteristics of the light outputted from each optical output waveguide 6, each center wavelength (for example, λ1, λ2, λ3, - - - , λn) is set to a center and light transmittance is reduced as the wavelength is shifted from each corresponding center wavelength. FIG. 13 is a view overlapping and showing an example of an output spectrum from each optical output waveguide 6.

It is not necessarily limited that the above light transmitting characteristics have one local maximum value as shown in FIG. 12A. For example, as shown in FIG. 12B, there is also a case in which the light transmitting characteristics have not less than two local maximum values.

Further, since the arrayed waveguide grating utilizes the principle of reciprocity (reversibility) of light, the arrayed waveguide grating has the function of an optical demultiplexer, and also has the function of an optical multiplexer. For example, in contrast to FIG. 11, the optical multiplexing is performed by making lights of a plurality of wavelengths different from each other inputted from the respective optical output waveguides 6 of the arrayed waveguide grating every wavelength. The light transmitted from each optical output waveguide 6 passes through a propagating path reverse to the above propagating path and is multiplexed through the second slab waveguide 5, the arrayed waveguide 4 and the first slab waveguide 3, and is emitted from one of the optical input waveguides 2.

The waveguide forming area of the above arrayed waveguide grating is originally mainly formed by a silica-based glass material. Therefore, the above center wavelength of the arrayed waveguide grating is shifted dependently on temperature by temperature dependence of the silica-based glass material. When a temperature changing amount of the arrayed waveguide grating is set to T, this temperature dependence is represented by (formula 3) by differentiating the above (formula 2) by this temperature changing amount T.

$$\frac{d\lambda}{dT} = \frac{\lambda}{n_c} \cdot \frac{\partial n_c}{\partial T} + \frac{\lambda}{L} \cdot \frac{\partial L}{\partial T} \qquad \text{(Formula 3)}$$

In the (formula 3), the first term on the right-hand side shows the temperature dependence of an effective refractive index of the arrayed waveguide 4, and the second term on the right-hand side shows a change in length of the arrayed waveguide 4 caused by expansion and contraction of the substrate.

FIG. 14 is a view typically showing the temperature dependence of this center wavelength by measuring results of the light transmitting characteristics outputted from some one of the optical output waveguides 6. As shown in FIG. 14, the center wavelength is shifted on a long wavelength side as the temperature of the arrayed waveguide grating rises. Conversely, the center wavelength is shifted on a short wavelength side as the temperature of the arrayed waveguide grating is reduced.

When the temperature rises, the refractive index of glass forming the waveguide is increased so that the first term on the right-hand side of (formula 3) is increased. Further, when the temperature rises, the length of the arrayed waveguide 4 is physically lengthened by thermal expansion of the substrate 1 and the waveguide material. Namely, the second term on the right-hand side of (formula 3) is increased. Accordingly, when the temperature rises, the length of a sensing optical path of the light passing through the arrayed waveguide 4 is lengthened so that the above center wavelength shift is caused.

FIG. 14 shows the temperature change in the transmitting characteristics of the light outputted from some one of the optical output waveguides 6, but the transmitting characteristics of the light outputted from all the optical output waveguides 6 show similar shift characteristics in the arrayed waveguide grating. Namely, in the light outputted from all the optical output waveguides 6, the center wavelength is shifted by the same shifting amount in the same shifting direction dependently on temperature.

In the conventional arrayed waveguide grating, $dn_c/dT = 1 \times 10^{-5}$ ($°\text{C}.^{-1}$) and $n_c = 1.451$ at a wavelength of $1.55\,\mu\text{m}$ are set. Further, there are many cases in which the arrayed waveguide grating is used at present to demultiplex and multiplex. Therefore, the temperature dependence of the above center wavelength of the conventional arrayed waveguide grating is calculated in the wavelength band with the wavelength 1550 nm as a center. Thus, a value of the temperature dependence of the center wavelength is set to about 0.01 nm/° C.

Accordingly, for example, when the temperature of the arrayed waveguide grating is changed by 50° C., the center wavelength outputted from each optical output waveguide 6 is shifted by 0.5 nm. When the temperature of the arrayed waveguide grating is changed by 70° C., the shifting amount of the above center wavelength is 0.7 nm.

In recent years, a demultiplexing or multiplexing wavelength interval calculated in the arrayed waveguide grating ranges from 0.4 nm to 1.6 nm and is very narrowed. Accordingly, as mentioned above, it cannot be neglected that the center wavelength is changed by the above shifting amount by the temperature change.

Therefore, an arrayed waveguide grating having a temperature adjusting means for constantly holding the temperature of the arrayed waveguide grating so as not to change the center wavelength by the temperature is conventionally proposed. For example, this temperature adjusting means is constructed by arranging a Peltier device, a heater, etc. These temperature adjusting means perform control for holding the arrayed waveguide grating to a set temperature determined in advance.

FIG. 15 shows a construction in which a Peltier device 26 is arranged on a side of the substrate 1 of the arrayed waveguide grating. In the arrayed waveguide grating shown in FIG. 15, the temperature of the arrayed waveguide grating is adjusted so as to be constantly held on the basis of a detecting temperature of a thermistor 40. In FIG. 15, reference numerals 41 and 12 respectively designate a lead wire and a soaking plate.

In a construction in which a heater is arranged instead of the Peltier device, the temperature of the arrayed waveguide grating is held to a high temperature by the heater and is constantly held.

In the construction for arranging the above temperature adjusting means, it is possible to restrain expansion and contraction of the substrate 1, a change in equivalent refractive index of the above core, etc. caused by temperature by constantly holding the temperature of the arrayed waveguide grating. Therefore, the problem of the temperature dependence of the above center wavelength can be dissolved in the construction for arranging the temperature adjusting means.

However, a controller, a thermistor for control, a thermocouple, etc. are naturally required to constantly hold the temperature of the arrayed waveguide grating by using the temperature adjusting means such as a Peltier device and a heater. In the arrayed waveguide grating constructed by arranging the temperature adjusting means, there was a case in which no center wavelength shift could be accurately restrained by an assembly shift of parts of the temperature adjusting means, etc.

Further, in the arrayed waveguide grating, precision is very required at a manufacturing of the arrayed waveguide grating. Therefore, the conventional arrayed waveguide grating also has the problem that the center wavelength is shifted from a design wavelength by an error (manufacture dispersion, etc.). Accordingly, the development of a cheap arrayed waveguide grating able to correct both the shift of the center wavelength from the design wavelength and the temperature dependence had been required.

DISCLOSURE OF THE INVENTION

The arrayed waveguide grating of a first construction of the present invention comprises;

a waveguide construction has at least optical input waveguide, a first slab waveguide connected to an emitting side of at least one optical input waveguide, an arrayed waveguide connected to an emitting side of the first slab waveguide and constructed by a plurality of channel waveguides having lengths different from each other by set amounts and arranged side by side, a second slab waveguide connected to an emitting side of the arrayed waveguide, and a plurality of optical output waveguides arranged side by side and connected to an emitting side of the second slab waveguide;

the waveguide construction is formed on a substrate;

separating slab waveguides are formed by separating at least one of said first slab waveguide and the second slab waveguide on a crossing face crossing a path of light passing through the slab waveguide;

a slide moving member for reducing the temperature dependence of a center wavelength of the arrayed waveguide grating by sliding and moving at least one side of the separated separating slab waveguides along said separating face dependently on temperature is arranged;

and a length of the slide moving member is set to a length for correcting a shift of the center wavelength of the arrayed waveguide grating from a set wavelength by plastic deformation of said slide moving direction.

The arrayed waveguide grating of a second construction of the present invention comprises;

the above slide moving member is plastically deformed by applying compression stress to the slide moving member in addition to the above first construction.

The arrayed waveguide grating of a third construction of the present invention is comprises;

the above slide moving member is plastically deformed by applying tensile stress to the slide moving member in addition to the above first construction.

The arrayed waveguide grating of a fourth construction of the present invention comprises;

a waveguide construction is formed on a substrate such that a first slab waveguide is connected to an emitting side of at least one optical input waveguide, and an arrayed waveguide constructed by a plurality of channel waveguides for propagating light transmitted from the first slab waveguide and having lengths different from each other by set amounts and arranged side by side is connected to an emitting side of the first slab waveguide, and a second slab waveguide is connected to an emitting side of the arrayed waveguide, and a plurality of optical output waveguides arranged side by side are connected to an emitting side of the second slab waveguide;

separating slab waveguides are formed by separating at least one of said first slab waveguide and the second slab waveguide on a crossing face crossing a path of light passing through the slab waveguide;

a slide moving member for reducing the temperature dependence of a center wavelength of the arrayed waveguide grating by sliding and moving at least one side of the separated separating slab waveguides along said separating face dependently on temperature is arranged;

a hollow or a hole is formed in a displacing area of the slide moving member in its sliding direction;

and a length of said slide moving member is set to a length for correcting a shift of the center wavelength of the arrayed waveguide grating from a set wavelength by fitting a fitting member having a large diameter portion having a diameter larger than that of an opening of the hollow or the hole into said hollow or the hole.

The arrayed waveguide grating of a fifth construction of the present invention comprises;

the above fitting member is set to a taper screw reduced in diameter toward its tip side in addition to the above fourth construction.

The arrayed waveguide grating of a sixth construction of the present invention comprises;

the above slide moving member is formed by a metal in addition to one of the above first to fifth constructions.

A method for correcting center wavelength of the arrayed waveguide grating of a seventh construction of the present invention comprises;

a waveguide construction has at least one optical input waveguide, a first slab waveguide connected to an emitting side of at least one optical input waveguide, an arrayed waveguide connected to an emitting side of the first slab waveguide and constructed by a plurality of channel waveguides having lengths different from each other by set amounts and arranged side by side, a second slab waveguide connected to an emitting side of the arrayed waveguide, and a plurality of optical output waveguides arranged side by side and connected to an emitting side of the second slab waveguide;

the waveguide construction is formed on a substrate; a separating slab waveguide is formed by separating at least one of said first slab waveguide an d the second slab waveguide on a crossing face crossing a path of light passing through the slab waveguide;

a slide moving member for reducing the temperature dependence of a center wavelength of the arrayed waveguide grating by sliding and moving at least one side of said separated separating slab waveguide along said separating face dependently on temperature is arranged in the arrayed waveguide a grating;

and the center wavelength of the arrayed waveguide grating is set to a set wavelength by moving at least one side of said separating slab waveguide along said separating face by plastically deforming the slide moving member.

The method for correcting a center wavelength of the arrayed waveguide grating of an eighth construction of the present invention comprises;

the above slide moving member is plastically deformed by applying compression stress to the above slide moving member in addition to the above seventh construction.

The method for correcting a center wavelength of the arrayed waveguide grating of a ninth construction of the present invention comprises;

the above slide moving member is plastically deformed by applying tensile stress to the above slide moving member in addition to the above seventh construction.

The method for correcting a center wavelength of the arrayed waveguide grating of a tenth construction of the present invention comprises;

a waveguide construction has at least one optical input waveguide, a first slab waveguide connected to an emitting side of the optical input waveguide, an arrayed waveguide connected to an emitting side of the first slab waveguide and constructed by a plurality of channel waveguides having lengths different from each other by set amounts and arranged side by side, a second slab waveguide connected to an emitting side of the arrayed waveguide, and a plurality of optical output waveguides arranged side by side and connected to an emitting side of the second slab waveguide;

the waveguide construction is formed on a substrate;

a separating slab waveguide is formed by separating at least one of said first slab waveguide and the second slab waveguide on a crossing face crossing a path of light passing through the slab waveguide;

a slide moving member for reducing the temperature dependence of a center wavelength of the arrayed waveguide grating by sliding and moving at least one side of said separated separating slab waveguide along said separating face dependently on temperature is arranged in the arrayed waveguide grating;

a hollow or a hole is formed in a displacing area of the slide moving member in its sliding direction;

and a length of said slide moving member in said sliding direction is changed and at least one side of said separating slab waveguide is moved along said separating face by fitting a fitting member having a large diameter portion having a diameter larger than that of an opening of the hollow or the hole into said hollow or the hole so that the center wavelength of the arrayed waveguide grating is set to a set wavelength.

The method for correcting a center wavelength of the arrayed waveguide grating of an eleventh construction of the present invention comprises;

while the center wavelength of the above arrayed waveguide grating is monitored, a movement along the separating face of the separating slab waveguide is made by the slide moving member so as to set the monitored center wavelength to the set wavelength in addition to one of the above seventh to tenth constructions.

The present inventors noticed linear dispersion characteristics of the arrayed waveguide grating to restrain the temperature dependence of the arrayed waveguide grating.

As mentioned above, in the arrayed waveguide grating, the center wavelength $\lambda_0$ at a diffraction angle $\phi=0$ is represented by the formula (2). A condensed position of the arrayed waveguide grating providing this diffraction angle $\phi=0$ is set to a point O in FIG. 10. In this case, for example, the condensed position (a position at an output end of the second slab waveguide) of light providing a diffraction angle $\phi=\phi_p$ becomes the position of a point P shifted from the point O in the X-direction. Here, when the distance between the points O and P in the X-direction is set to x, the following (formula 4) is formed between the distance x and the wavelength $\lambda$.

$$\frac{dx}{d\lambda} = \frac{L_f \cdot \Delta L}{n_s \cdot d \cdot \lambda_0} n_g \quad \text{(Formula 4)}$$

In the (formula 4), $L_f$ is a focal length of the second slab waveguide, and $n_g$ is a group refractive index of the arrayed waveguide. The group refractive index $n_g$ of the arrayed waveguide is provided by the following (formula 5) using an equivalent refractive index $n_c$ of the arrayed waveguide.

$$n_g = n_c - \lambda_0 \frac{d \cdot n_c}{d\lambda} \quad \text{(Formula 5)}$$

The above (formula 4) means that light different by $d\lambda$ in wavelength can be taken out by arranging and forming an input end of the optical output waveguide is arranged and formed in a position separated by the distance dx in the X-direction from the focal point O of the second slab waveguide.

The relation of the (formula 4) is similarly formed with respect to the first slab waveguide 3. For example, a focal center of the first slab waveguide 3 is set to a point O', and a point located in a position shifted by a distance dx' in the X-direction from this point O' is set to a point P'. In this case, when light is transmitted to this point P', an output wavelength is shifted by $d\lambda'$. This relation is represented by the following (formula 6).

$$\frac{dx'}{d\lambda'} = \frac{L_f' \cdot \Delta L}{n_s \cdot d \cdot \lambda_0} n_g \quad \text{(Formula 6)}$$

In the (formula 6), $L_f'$ is a focal length of the first slab waveguide. This (formula 6) means that light different by $d\lambda'$ in wavelength in the optical output waveguide formed at the above focal point O can be taken out by arranging and forming an output end of the optical input waveguide in a position separated by the distance dx' in the X-direction from the focal point O' of the first slab waveguide.

Accordingly, when the center wavelength outputted from the optical output waveguide of the arrayed waveguide grating is shifted by $\Delta\lambda$ by the temperature change, the shift of the center wavelength is corrected by shifting the output end position of the optical input waveguide by the distance dx' in the above X-direction so as to set $d\lambda'=\Delta\lambda$. For example, light having no wavelength shift can be taken out by this shifting operation in the optical output waveguide formed at the focal point O. Further, since the above action is similarly caused with respect to the other optical output waveguides, the above shift $\Delta\lambda$ of the center wavelength can be corrected (dissolved).

In the present invention of the above construction, at least one of the first slab waveguide and the second slab waveguide is separated on a face crossing the path of light passing through the slab waveguide. Here, an argument will be made by assuming that the first slab waveguide is separated. For example, a separating slab waveguide side (including the optical input waveguide) connected to the optical input waveguide among this separated first slab waveguide is slid and moved along the above separating face by the slide moving member. Thus, the above each center wavelength can be shifted by this sliding movement.

Further, the separating slab waveguide and the optical input waveguide are moved by the above slide moving member along the above separating face in a direction for reducing the temperature dependence change of the above each center wavelength such that the temperature dependence change (wavelength shift) Δλ of the above each center wavelength is equal to dλ. Thus, the above center wavelength shift depending on temperature can be dissolved.

strictly speaking, the focal length $L_f'$ of light propagated within the first slab waveguide is slightly changed from the output end of the optical input waveguide to an input end of the arrayed waveguide by changing the position of the output end of the optical input waveguide. However, the focal length of the first slab waveguide in the arrayed waveguide grating used at present is of the order of several mm. In contrast to this, a moving amount of the output end position of the optical input waveguide moved to correct the center wavelength of the arrayed waveguide grating is of the order from several μm to several ten μm. Namely, the moving amount of the output end position of the above optical input waveguide is very small in comparison with the focal length of the first slab waveguide.

Therefore, it is substantially considered that the change in the above focal length can be neglected. Thus, as mentioned above, the center wavelength shift depending on temperature can be dissolved if the separating slab waveguide and the optical input waveguide are moved along the above separating face in the direction for reducing the temperature dependence change of each center wavelength in the arrayed waveguide grating.

Here, the relation of a temperature changing amount and a position correcting amount of the optical input waveguide will be derived in advance. Since the temperature dependence (the shifting amount of the center wavelength due to temperature) of the above center wavelength is represented by the above (formula 3), the shifting amount Δλ of the center wavelength can be represented by the following (formula 7) using the temperature changing amount T.

$$\Delta\lambda = \frac{d\lambda}{dT}T \qquad \text{(Formula 7)}$$

When the temperature changing amount T and the position correcting amount dx' of the optical input waveguide are calculated from (formula 6) and (formula 7), the following (formula 8) is derived.

$$dx' = \frac{L_f' \cdot \Delta L}{n_s \cdot d \cdot \lambda_0} n_g \frac{d\lambda}{dT} T \qquad \text{(Formula 8)}$$

In the present invention, the separating slab waveguide of the first slab waveguide and the optical input waveguide are slid and moved by the above slide moving member along the above separating face dependently on temperature by the position correcting amount dx' shown by (formula 8). The above center wavelength shift depending on temperature can be dissolved by this sliding movement.

When the center wavelength of the arrayed waveguide grating is shifted from the set wavelength such as a grid wavelength, etc., it is also important to correct this shift. In the arrayed waveguide grating of the present invention, as mentioned above, if a separating slab waveguide side connected to the optical input waveguide is slid and moved along the above separating face, the above each center wavelength can be shifted. Therefore, in the present invention, the separating slab waveguide is slid and moved along the above separating face by changing the length of the slide moving member in the above slide moving direction by plastic deformation of the slide moving member, etc. Therefore, in the present invention, the center wavelength of the arrayed waveguide grating can be shifted to the set wavelength.

For example, the above slide moving member is plastically deformed by applying compression stress and tensile stress to the slide moving member. Further, the length of the slide moving member in the slide moving direction can be also changed by fitting a fitting member into a hollow or a hole formed in the slide moving member.

The center wavelength of the arrayed waveguide grating can be approximately set to the set wavelength by setting the length of the slide moving member to a length for correcting the shift of the center wavelength of the arrayed waveguide grating from the set wavelength.

In the present invention, as mentioned above, the slide moving member slides and moves the separating slab waveguide dependently on temperature. Accordingly, for example, if the temperature dependence of the center wavelength of the arrayed waveguide grating is reduced by this sliding movement, it is possible to construct an excellent arrayed waveguide grating in which the center wavelength approximately becomes the set wavelength at any temperature within a using temperature range.

As mentioned above, the arrayed waveguide grating is formed by utilizing reciprocity of light. Therefore, similar effects are also obtained when the slide moving member for separating a second slab waveguide side and sliding and moving at least one side of the separated separating slab waveguides in the direction for reducing the temperature dependence change of the above each center wavelength along the above separating face is arranged. In the arrayed waveguide grating of this construction, the center wavelength can be set to the set wavelength at any temperature within the using temperature range.

BEST MODE FOR CARRYING OUT THE INVENTION

Figure 1A:
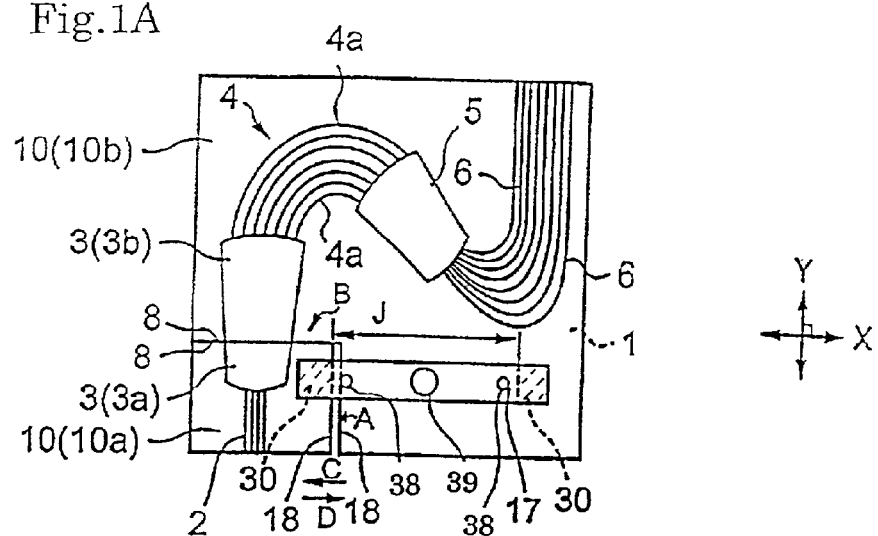
FIG. 1A is a plan view showing the construction of a main portion of a first embodiment of an arrayed waveguide grating in the present invention.

The present invention will now be described on the basis of respective embodiments with reference to the accompanying drawings, wherein like reference numerals designate corresponding or identical elements throughout the various drawings.

Figure 1B:
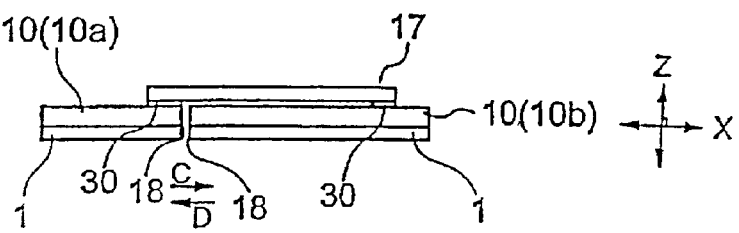
FIG. 1B is a side view of this construction.

FIGS. 1A and 1B typically show schematic views of a first embodiment of an arrayed waveguide grating in the present invention. FIGS. 1A and 1B are respectively plan and side views of this arrayed waveguide grating in the first embodiment.

As shown in FIGS. 1A and 1B, the waveguide construction of a core is formed on a substrate 1 in the arrayed waveguide grating of the first embodiment. However, in the arrayed waveguide grating of the first embodiment, a first slab waveguide 3 is separated on a cross separating face 8 of a face (separating face) crossing a path of light passing through the first slab waveguide 3.

The cross separating face 8 is formed from one end side (a left-hand end side of FIGS. 1A and 1B) of a waveguide forming area 10 to an intermediate portion of the waveguide forming area. A non-cross separating face 18 not crossing the first slab waveguide 3 is formed in communication with this cross separating face 8. In the first embodiment, the non-cross separating face 18 is arranged perpendicularly to the cross separating face 8, but may not be also perpendicular to the cross separating face 8. FIG. 1A shows a mode in which the non-cross separating face 18 and the cross separating face 8 are perpendicular to each other.

The cross separating face 8 and the non-cross separating face 18 separate the waveguide forming area 10 into a first waveguide forming area 10a including a separating slab waveguide 3a on one side, and a second waveguide forming area 10b including a separating slab waveguide 3b on the other side.

Since the above first waveguide forming area 10a and the second waveguide forming area 10b are separated from each other, these waveguide forming areas are arranged through a clearance. For example, the distance of an A-portion (the distance between the non-cross separating faces 18) shown in FIG. 1A is set to about 100 $\mu$m. The distance of a B-portion (the distance between the cross separating faces 8) shown in FIG. 1A is set to about 25 $\mu$m.

In the first embodiment, a slide moving member 17 for moving the first waveguide forming area 10a along the cross separating face 8 with respect to the second waveguide forming area 10b dependently on temperature of the arrayed waveguide grating is arranged. The slide moving member 17 is constructed such that this slide movement is made in a direction for reducing center wavelength temperature dependence of the arrayed waveguide grating.

The above slide moving member 17 is formed by a copper plate as a metal having a coefficient of thermal expansion larger than that of the substrate 1. The coefficient of thermal expansion of copper is $1.65 \times 10^{-5}$ (1/K). An adhesive 30 is arranged on a lower side of the slide moving member 17, and the slide moving member 17 is fixed to a portion for fixation of the waveguide forming areas 10a, 10b.

In the first embodiment, each parameter in the above waveguide construction is constructed as follows.

Namely, a focal length $L_f'$ of the first slab waveguide 3 and a focal length $L_f$ of the second slab waveguide 5 are equal to each other, and are set to 9 mm (9000 $\mu$m). Both equivalent refractive indexes of the first slab waveguide 3 and the second slab waveguide 5 are set to $n_s$ at 25° C. and are set to 1.453 with respect to light of 1.55 $\mu$m in wavelength. Further, an adjacent optical path length difference $\Delta L$ of a plurality of channel waveguides 4a of an arrayed waveguide 4 is set to 65.2 $\mu$m, and the interval d between adjacent channel waveguides 4a at the end of the arrayed waveguide 4 is set to 15 $\mu$m. diffraction order m of the arrayed waveguide grating is set to 61, and an equivalent refractive index $n_c$ of the arrayed waveguide 4 is set to 1.451 with respect to light of 1.55 $\mu$m in wavelength. A group refractive index $n_g$ of the arrayed waveguide 4 is set to 1.475 with respect to light of 1.55 $\mu$m in wavelength.

Accordingly, in the arrayed waveguide grating of the first embodiment, a center wavelength $\lambda_0$ providing a diffraction angle $\phi=0$ is set to $\lambda_0$=about 1550 nm as can be seen from the above (formula 2).

In the first embodiment, the moving amount of an output end of an optical input waveguide 2 provided by the movement of a side of the separating slab waveguide 3a is set to dx'. When a relative value of this moving amount dx' and a central wavelength shift amount dλ' is calculated, dx'=25.6 dλ' is obtained. Accordingly, it can be seen that the length of a thermal expansion coefficient utilizing area in a longitudinal direction of the slide moving member 17 is changed by 2.56 μm to change the center wavelength by 0.1 nm.

Further, since the coefficient of thermal expansion of the substrate 1 is very small in comparison with the coefficient of thermal expansion of the slide moving member 17, the length of the thermal expansion coefficient utilizing area of the copper plate required to compensate the temperature dependence 0.01 nm/° C. of a center wavelength of the arrayed waveguide grating is calculated by neglecting this coefficient of the thermal expansion of the substrate 1. Thus, the value (calculated value) $J_c$ of the length of the above thermal expansion coefficient utilizing area is set to $J_c$=17 mm. When an optimum value of the length of a fixing position distance (J in FIG. 1A) of the slide moving member 17 is calculated by an experiment on the basis of this calculated value, it has been found that it is sufficient to set this optimum value to 20 mm.

Therefore, in the first embodiment, the entire length of the slide moving member 17 and the length of the fixing position distance are determined so as to set the length of J to 20 mm, and the arrayed waveguide grating is manufactured.

Further, in the first embodiment, hole portions 38, 39 are formed in the slide moving member 17. As shown by an arrow E of FIGS. 1C and 1D, tensile stress is applied to the slide moving member 17 so that the slide moving member 17 is plastically deformed in the above slide moving direction (an X-direction in these figures).

Since the hole portion 39 is formed in the slide moving member 17, the slide moving member 17 is easily deformed. Since a forming position of the hole portion 39 is located in a central portion of the slide moving member 17, the slide moving member 17 can be expanded and contracted while strength of the slide moving member 17 in its bending direction is approximately maintained.

The length of the slide moving member 17 is set to a length for correcting the shift of the center wavelength of the arrayed waveguide grating from a set wavelength on a short wavelength side by the plastic deformation in the slide moving direction caused by the above tensile stress.

Figure 1C:
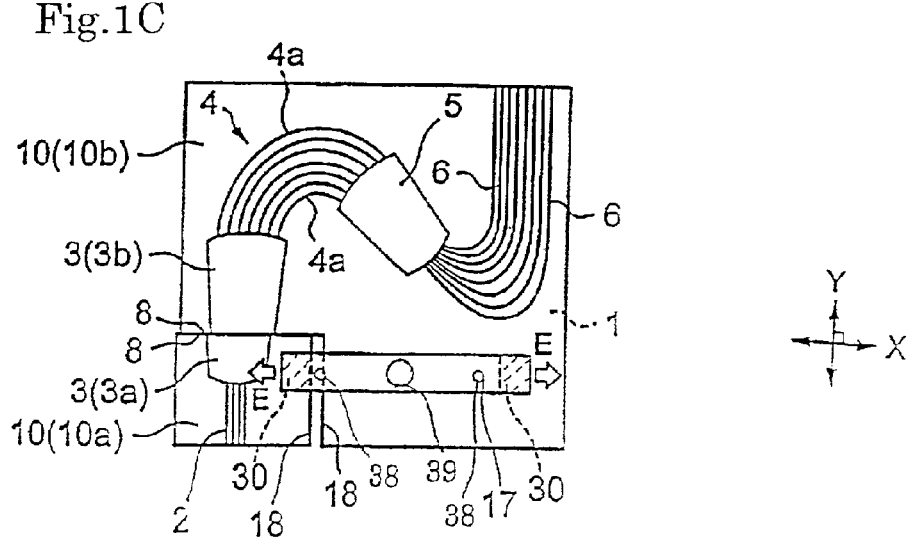
FIG. 1C is an explanatory view showing a plastic deformation operation of a slide moving member arranged in the first embodiment by a plan view.
Figure 1D:
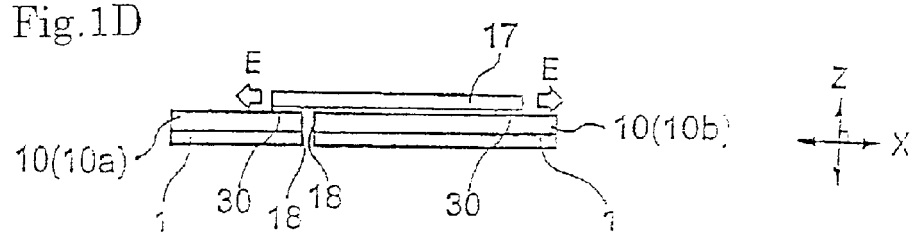
FIG. 1D is a side view showing this plastic deformation operation.

FIGS. 1C and 1D exaggeratedly show a length changing amount of the slide moving member 17. Namely, FIGS. 1C and 1D exaggeratedly show a distance changing amount of the non-cross separating face 18. However, this changing amount is really very smaller than the changing amount shown in FIGS. 1C and 1D.

Figure 3:
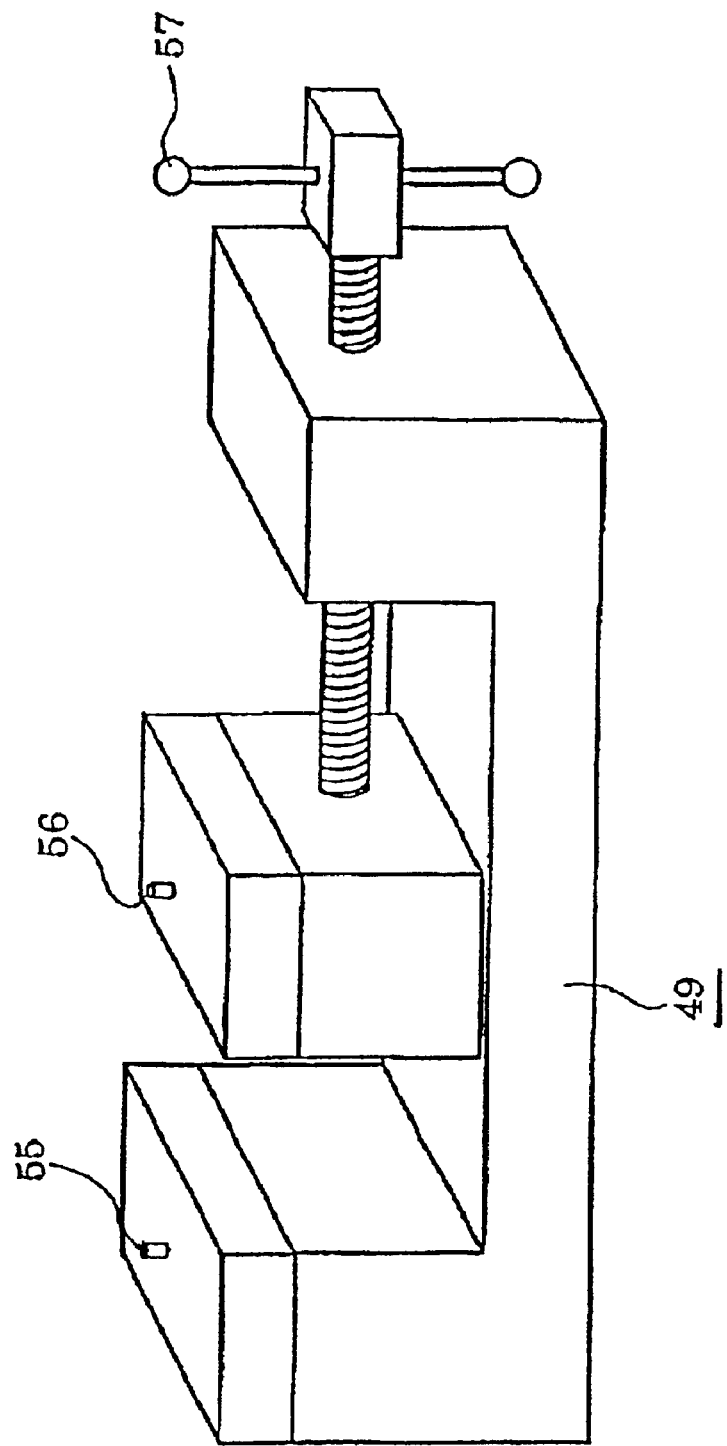
FIG. 3 is an explanatory view showing an example of a jig applied to the center wavelength correction of the arrayed waveguide grating of the first embodiment.

The plastic deformation of the above slide moving member 17 is performed by, for example, a vice 49 as a stress applying means shown in FIG. 3. Namely, the above tensile stress applied to the slide moving member 17 is adjusted by inserting each of pins 55, 56 arranged in the vice 49 into respectively each of the hole portions 38 of the slide moving member 17. The tensile stress applied to the above slide moving member 17 is adjusted by adjusting a position of the pin 56 by operating a handle 57 in an insertion state of the pins 55, 56.

Figure 2:
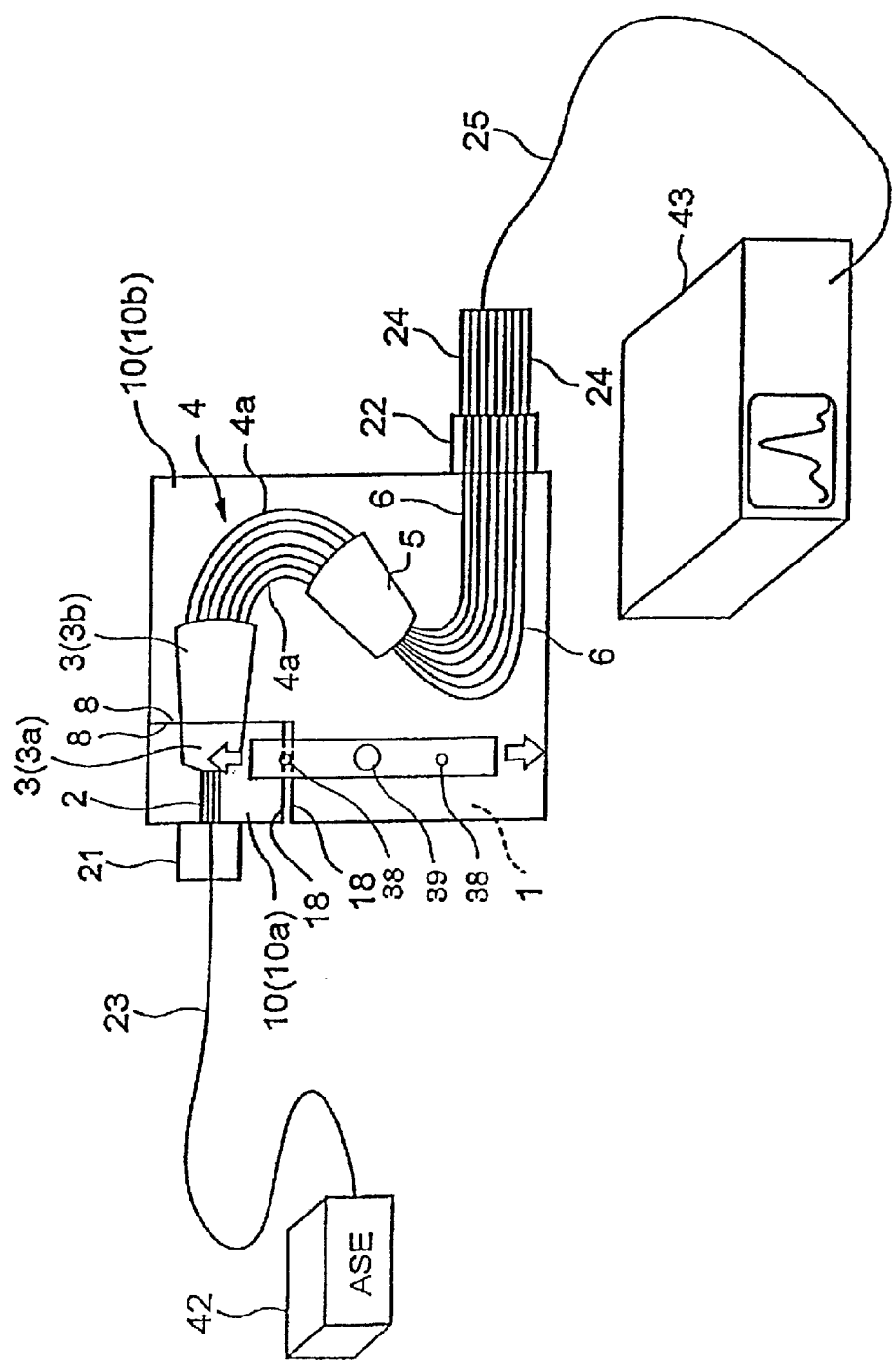
FIG. 2 is an explanatory view typically showing an example of a center wavelength correcting process of the arrayed waveguide grating of the first embodiment.

In the first embodiment, when the tensile stress is applied to the above slide moving member 17, a Amplified Spontanious Emission (ASE) light source 42 is connected to one of the optical input waveguides 2 of the arrayed waveguide grating as shown in FIG. 2. Further, an optical spectrum analyzer 43 is connected to one of optical output waveguides 6 of the arrayed waveguide grating. While the center wavelength of the arrayed waveguide grating is monitored by the optical spectrum analyzer 43, the tensile stress in a direction shown by an arrow of FIG. 2 is applied to the slide moving member 17 and the plastic deformation of the slide moving member 17 is performed.

In FIG. 2, reference numerals 21, 22 designate optical fiber arrays, and reference numerals 23, 25 designate optical fibers, and reference numeral 24 designates an optical fiber ribbon.

Figure 4:
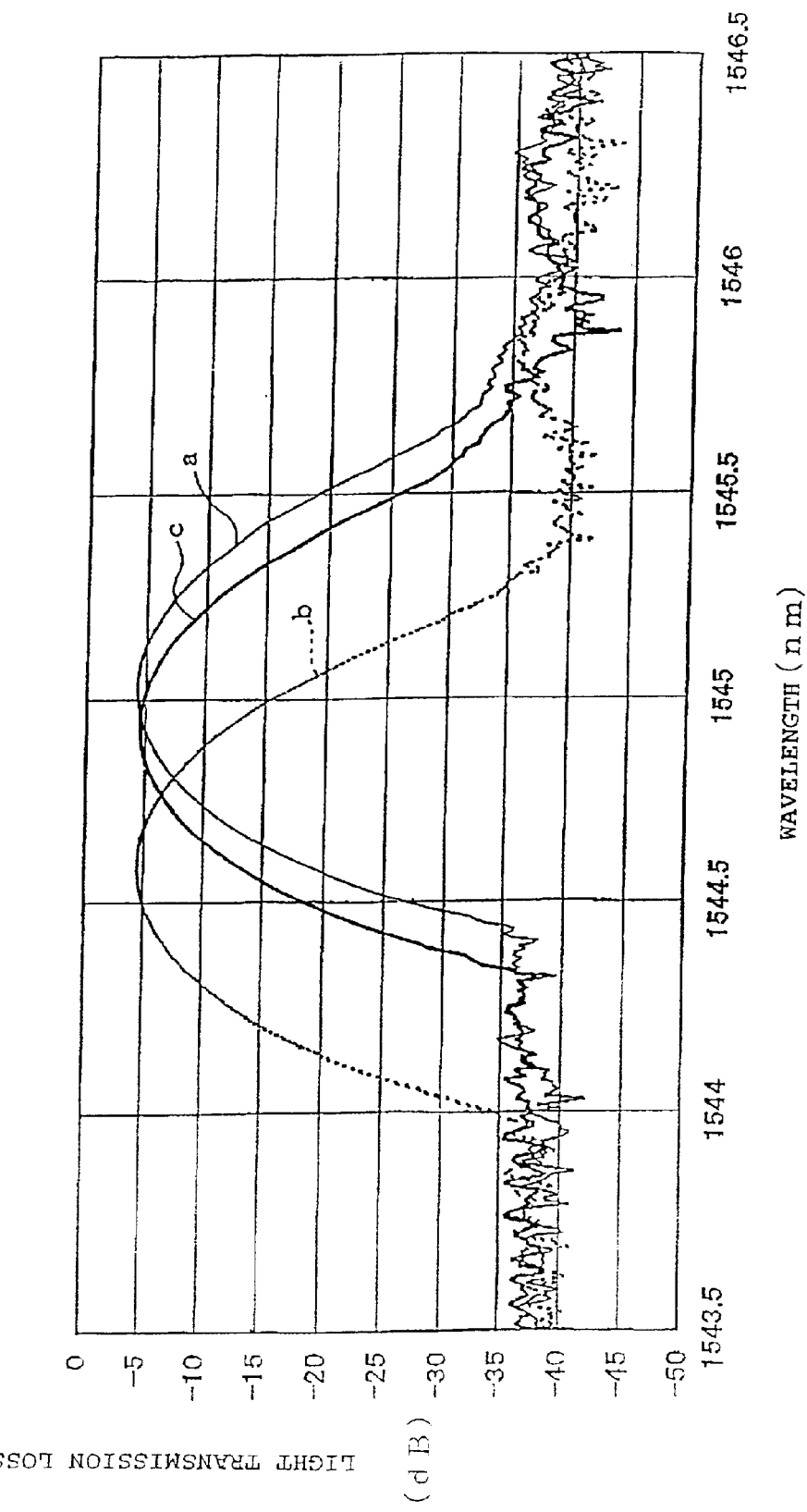
FIG. 4 is a graph showing light transmitting characteristics before the center wavelength correction of the arrayed waveguide grating of the first embodiment, when stress for making this correction is applied, and after the center wavelength correction.

A characteristic line a of FIG. 4 shows light transmitting loss characteristics (light transmitting spectrum) of the arrayed waveguide grating before the tensile stress is applied to the slide moving member 17. In the first embodiment, as shown by a characteristic line b of FIG. 4, the tensile stress is released and the vice 49 is detached from the slide moving member 17 when the center wavelength of the arrayed waveguide grating is changed by about −0.5 nm. Further, when the light transmitting spectrum of the arrayed waveguide grating is measured after the release of the above tensile stress, the result shown by a characteristic line c of FIG. 4 is obtained.

As shown by these characteristic lines a to c, no change in optical characteristics can be seen in the light transmitting spectrum at the applying time of the above tensile stress or after the release of the tensile stress except that the center wavelength is shifted in comparison with a case prior to the application of the tensile stress.

Further, although the center wavelength of the arrayed waveguide grating is shifted by −0.5 nm at the applying time of the above tensile stress, the shifting amount of the center wavelength at a releasing time of the above tensile stress is −0.1 nm. This means that the slide moving member 17 is plastically deformed by −0.1 nm as the center wavelength shifting amount of the arrayed waveguide grating. This also means that the center wavelength shifting amount (changing amount) provided by adding this plastic deformation and elastic deformation at a tensile time is −0.5 nm.

Thus, it is preferable to calculate a changing amount of the center wavelength of the arrayed waveguide grating from its initial value in advance with respect to each of the applying time of the tensile stress to the slide moving member 17 and the releasing time of the tensile stress so as to obtain a predetermined desirable center wavelength changing amount. When such a center wavelength changing amount is measured, for example, the center wavelength can be set to a grid wavelength.

As mentioned above, the temperature dependence of the center wavelength of the light outputted from each optical output waveguide 6 is equal in the arrayed waveguide grating. Therefore, as mentioned above, when the center wavelength from one of the optical output waveguides 6 is set to the grid wavelength, the center wavelengths from the other optical output waveguides 6 are also set to the grid wavelength.

The first embodiment is constructed as mentioned above, and the slide moving member 17 is plastically deformed in the slide moving direction by applying the tensile stress to the slide moving member 17 as shown by the arrow E of FIGS. 1C and 1D. In the first embodiment, the length of the slide moving member 17 is set to the length for correcting the shift of the center wavelength of the arrayed waveguide grating from the set wavelength by this plastic deformation. Accordingly, in the first embodiment, the center wavelength of the arrayed waveguide grating can be set to the set wavelength (grid wavelength) by a very simple construction.

Further, in accordance with the first embodiment, when the temperature of the arrayed waveguide grating is changed, the above slide moving member 17 is expanded and contracted dependently on temperature. A side of the separating slab waveguide 3a is slid and moved by this expansion and contraction along the separating face 8 in a direction for reducing a temperature dependence change of each center wavelength of the arrayed waveguide grating. The reducing direction of the temperature dependence of each center wavelength is the direction of an arrow C or D of FIGS. 1A and 1B.

Therefore, in accordance with the first embodiment, even when the temperature of the arrayed waveguide grating is changed, the center wavelength shift caused by this temperature can be dissolved by correcting the shift from the set wavelength. Namely, in the first embodiment, it is possible to set the arrayed waveguide grating of a so-called temperature independence type not depending on temperature.

Accordingly, in the first embodiment, it is possible to set an arrayed waveguide grating in which the center wavelength becomes the set wavelength (grid wavelength) at any temperature within a using temperature range.

When the present inventors measured the temperature change of the center wavelength at 0° C. to 80° C. in the arrayed waveguide grating of the first embodiment, a shifting amount of the center wavelength was about not more than 0.01 nm. Namely, it has been able to be confirmed by this measurement that the arrayed waveguide grating of the first embodiment is an arrayed waveguide grating in which no center wavelength is almost shifted even when the temperature is changed within a range from 0° C. to 80° C., and the center wavelength is always the grid wavelength.

Figure 5A:
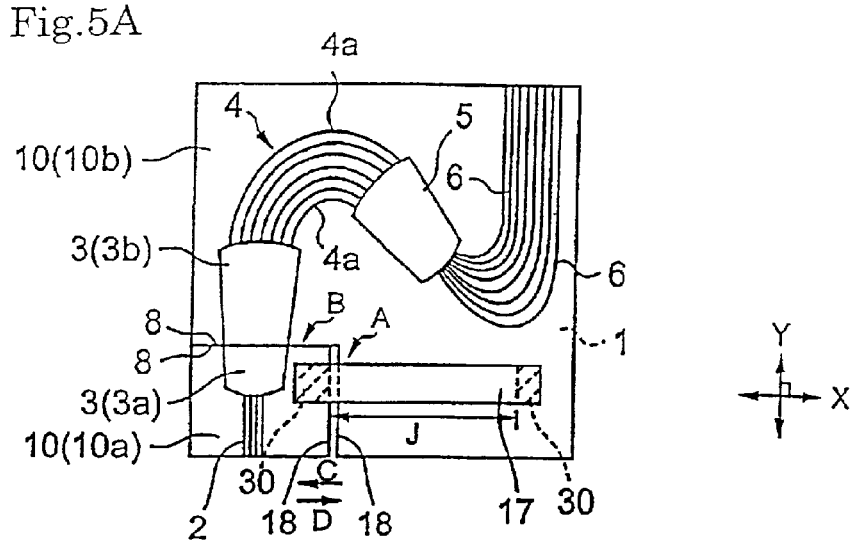
FIG. 5A is a plan view showing the construction of a main portion of a second embodiment of the arrayed waveguide grating in the present invention.
Figure 5B:
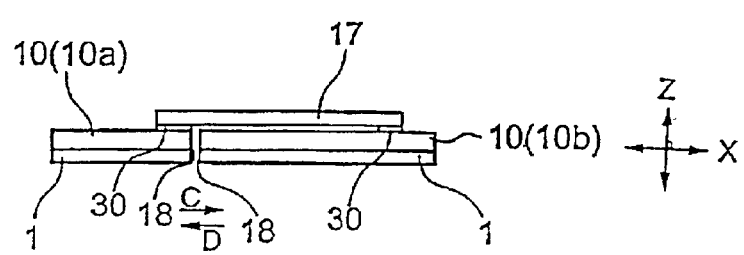
FIG. 5B is a side view showing this construction.

FIGS. 5A and 5B typically show schematic views of a second embodiment of the arrayed waveguide grating in the present invention. This second embodiment is constructed approximately similarly to the above first embodiment. In an explanation of this second embodiment, an overlapping explanation with the above first embodiment is omitted or simplified.

Figure 5C:
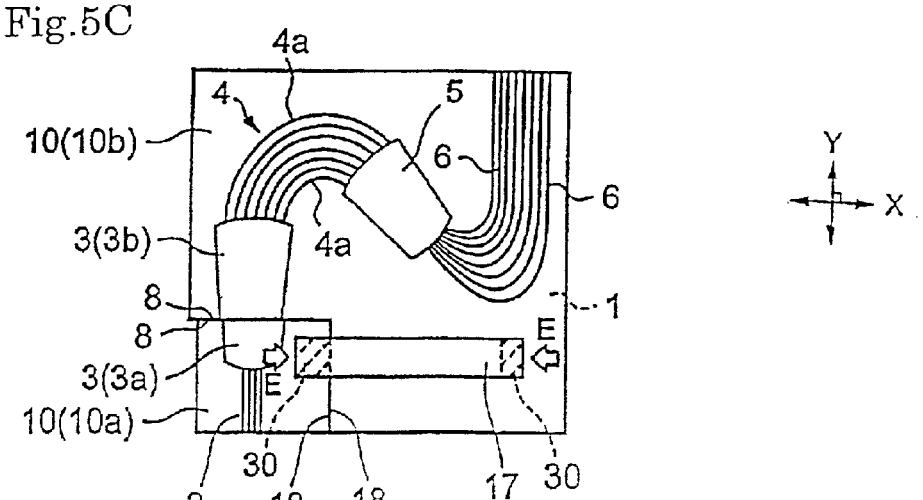
FIG. 5C is an explanatory view showing a plastic deformation operation of a slide moving member arranged in the second embodiment by a plan view.
Figure 5D:
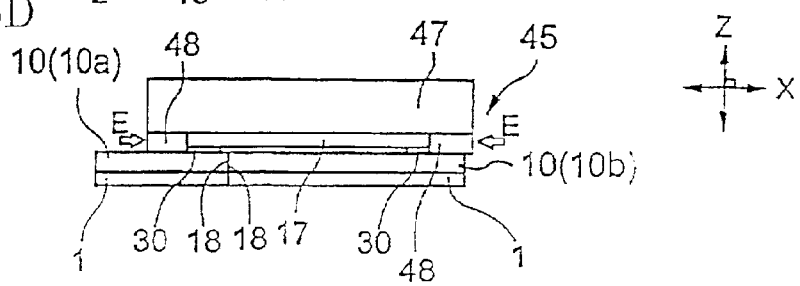
FIG. 5D is a side view showing this plastic deformation operation.

This second embodiment characteristically differs from the above first embodiment in that the slide moving member 17 is plastically deformed in the above slide moving direction age (the X-direction of FIGS. 5A and 5B) by applying compression stress to the slide moving member 17. As shown in FIGS. 5C and 5D, this compression stress is applied in a direction shown by an arrow E of FIGS. 5C and 5D by nipping the slide moving member 17 from both left-hand and right-hand sides. In the second embodiment, no hole portions 38, 39 are formed in the slide moving member 17.

In the second embodiment, the length of the slide moving member 17 is set to a length for correcting the shift of the center wavelength of the arrayed waveguide grating from the set wavelength on a long wavelength side by the plastic deformation in the above slide moving direction.

In FIGS. 5C and 5D, a length changing amount of the slide moving member 17 is exaggeratedly shown. Namely, a distance changing amount of the non-cross separating face 18 is exaggeratedly shown. However, the changing amount of the length of the slide moving member 17 is really very smaller than the changing amount shown by these figures.

The above plastic deformation is performed by a compression stress applying means 45 such as a vice, etc. The compression stress applying means 45 has a guide 47 for regulating the deformation of the slide moving member 17, and a pressing jig 48 for precisely changing the length of the slide moving member 17 in its longitudinal direction by applying the compression stress to the slide moving member 17.

Figure 6:
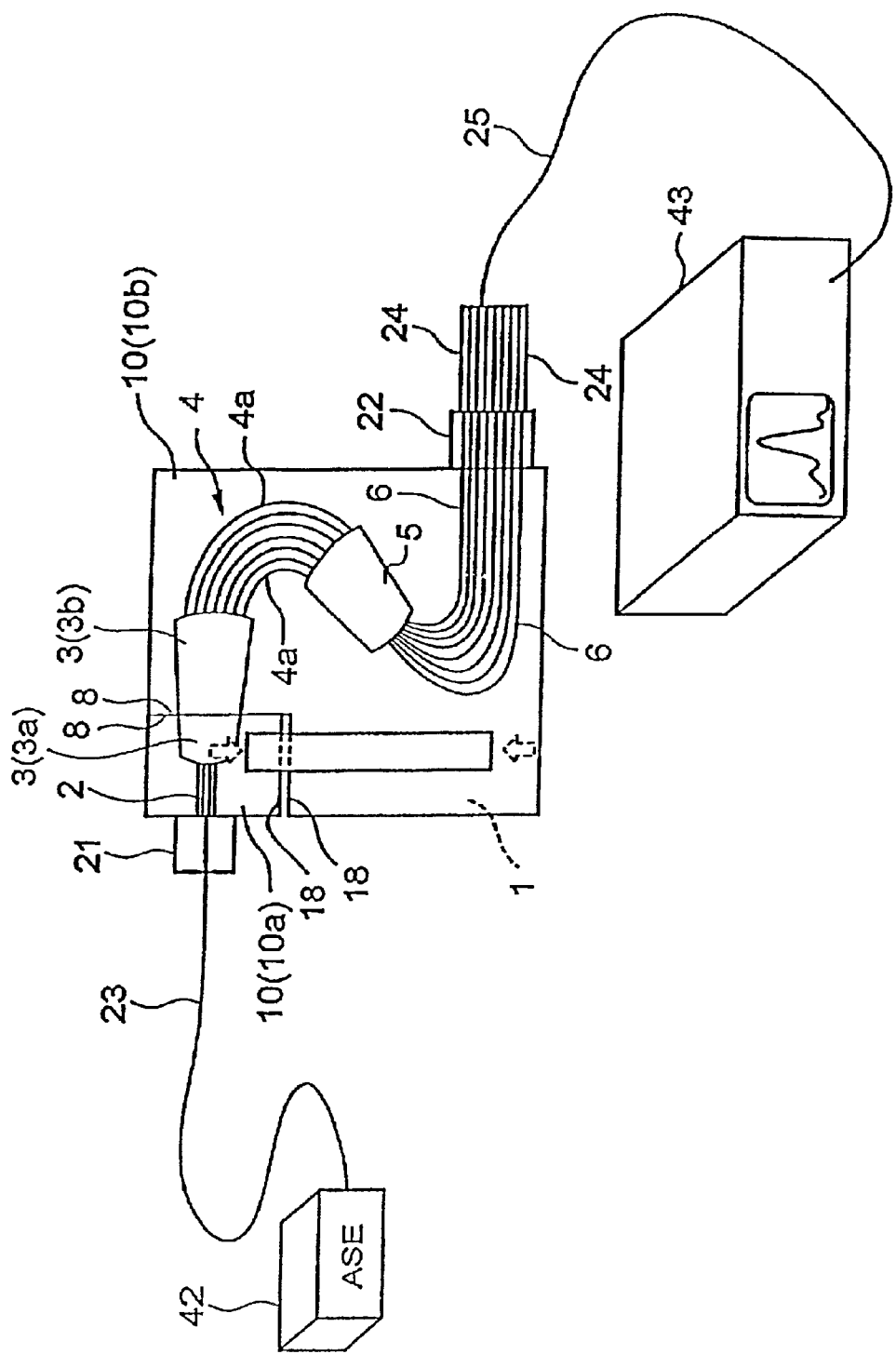
FIG. 6 is an explanatory view typically showing an example of a center wavelength correcting process of the arrayed waveguide grating of the second embodiment.

In the second embodiment, when the compression stress is applied to the slide moving member 17, similar to the above first embodiment, the center wavelength of the arrayed waveguide grating is monitored by the optical spectrum analyzer 43 as shown in FIG. 6. The slide moving member 17 is then plastically deformed such that the monitored the center wavelength becomes the set wavelength.

As one example, in a plastic deforming process of the above slide moving member 17, the present inventors measured the center wavelength of light outputted from an eighth optical output waveguide 6 as an eighth port of the arrayed waveguide grating before the plastic deformation of the slide moving member 17. As a result, the value of the center wavelength was 1550.20 nm. Therefore, the slide moving member 17 was plastically deformed by the above method in the above slide moving direction, and the center wavelength of the eighth port of the arrayed waveguide grating was changed to 1550.116 nm as the above grid wavelength.

In the second embodiment, when the center wavelength from one of the optical output waveguides 6 is set to the grid wavelength, the center wavelengths from the other optical output waveguides 6 can be also set to the grid wavelength. Effects similar to those in the above first embodiment can be also obtained in the second embodiment.

The present invention is not limited to the above respective embodiments, but various embodiment modes can be adopted. For example, in the above first embodiment, the slide moving member 17 was plastically deformed by applying the tensile stress to the slide moving member 17. However, for example, if a position adjusting direction of the pin 56 using the vice 49 is set to be reverse to that in the above first embodiment, the compression stress can be applied to the slide moving member 17. In this case, the center wavelength of the arrayed waveguide grating can be changed to a long wavelength side.

Figure 7A:
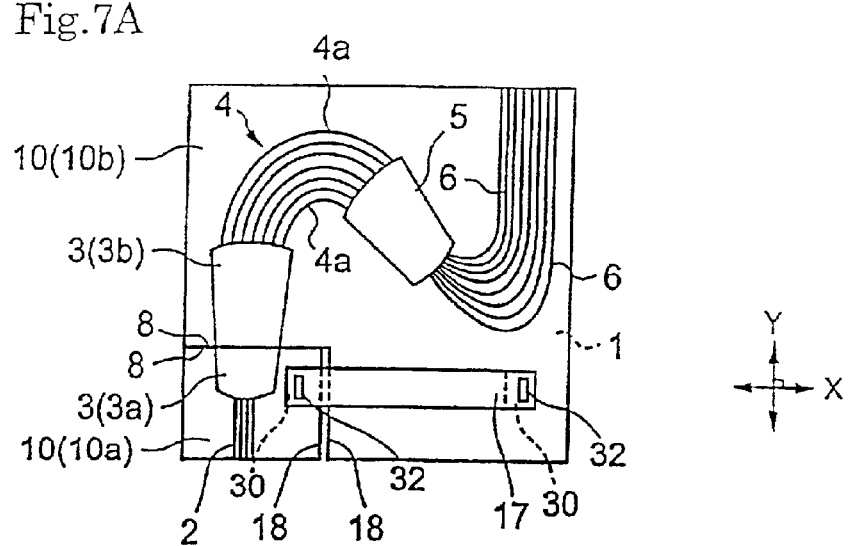
FIG. 7A is a plan view showing the construction of a main portion of another embodiment of the arrayed waveguide grating of the present invention.
Figure 7B:
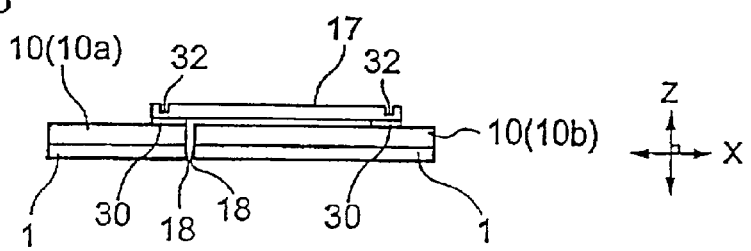
FIG. 7B is a side view showing this construction.
Figure 7C:
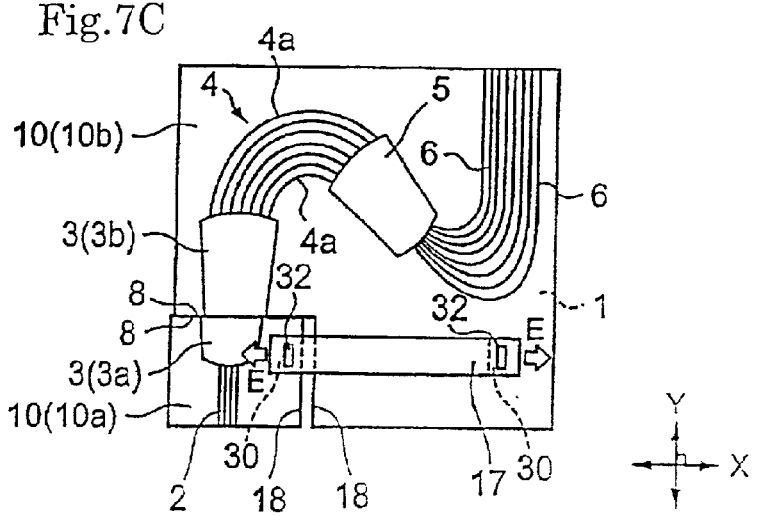
FIG. 7C is an explanatory view showing the plastic deformation operation of a slide moving member arranged in the embodiment shown in FIGS. 7A and 7B by a plan view.
Figure 7D:
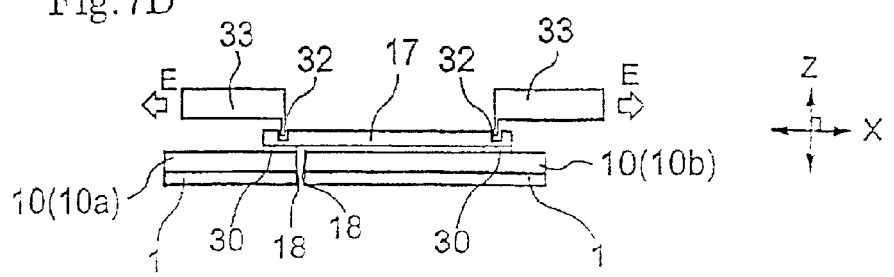
FIG. 7D is a side view showing this plastic deformation operation.

For example, as shown in FIGS. 7A and 7B, the slide moving member 17 may be also formed by arranging dent 32 for a tensile jig on a surface side of the slide moving member 17. In this construction, as shown by an arrow E of FIGS. 7C and 7D, the slide moving member 17 can be plastically deformed by applying the tensile stress. For example, this tensile stress is applied by a tensile jig 33 as shown in FIG. 7D.

In this construction, similar to the above first embodiment, the shift of the center wavelength of the arrayed waveguide grating from the set wavelength can be corrected to a short wavelength side by plastically deforming the slide moving member 17 in the above slide moving direction.

Figure 8A:
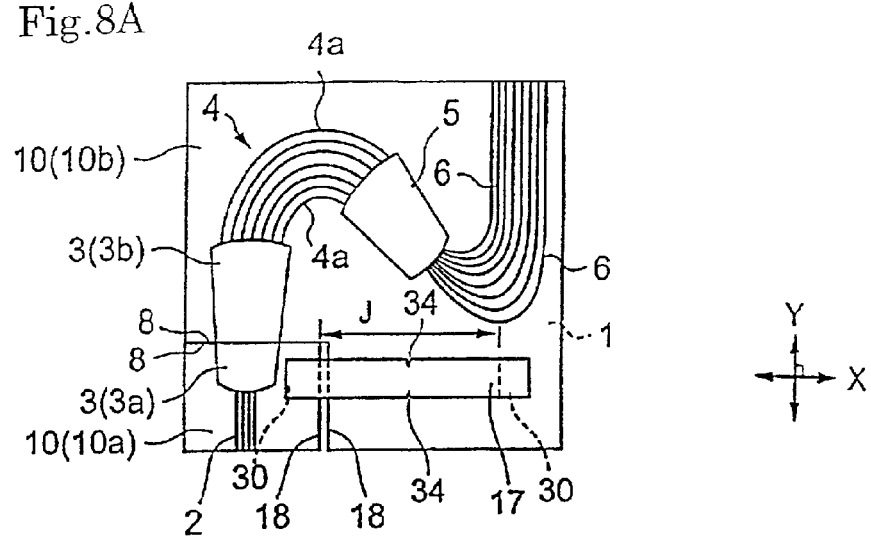
FIG. 8A is a plan view showing the construction of a main portion of another embodiment of the arrayed waveguide grating of the present invention.
Figure 8B:
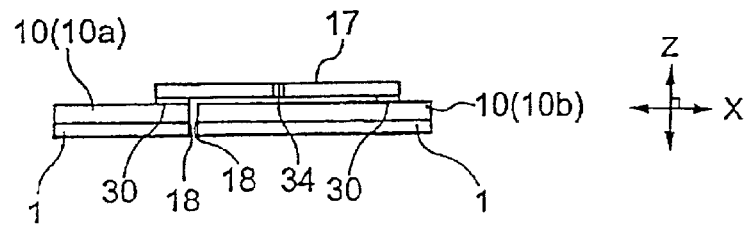
FIG. 8B is a side view showing this construction.
Figure 8C:
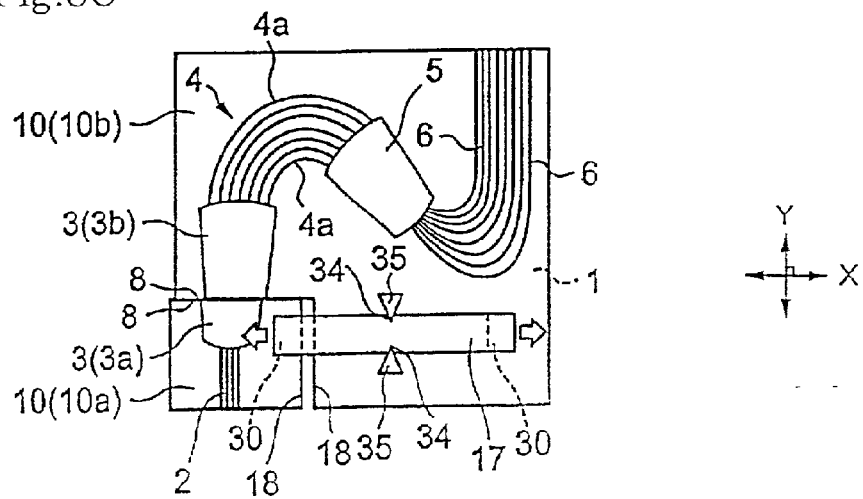
FIG. 8C is an explanatory view showing the plastic deformation operation of a slid moving member arranged in the embodiment shown in FIGS. 8A and 8B by a plan view.
Figure 8D:
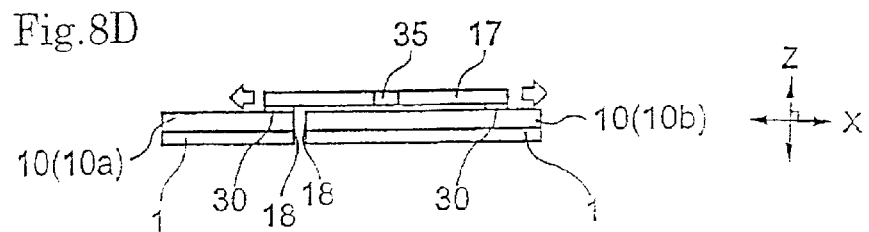
FIG. 8D is a side view showing this plastic deformation operation.
Figure 9A:
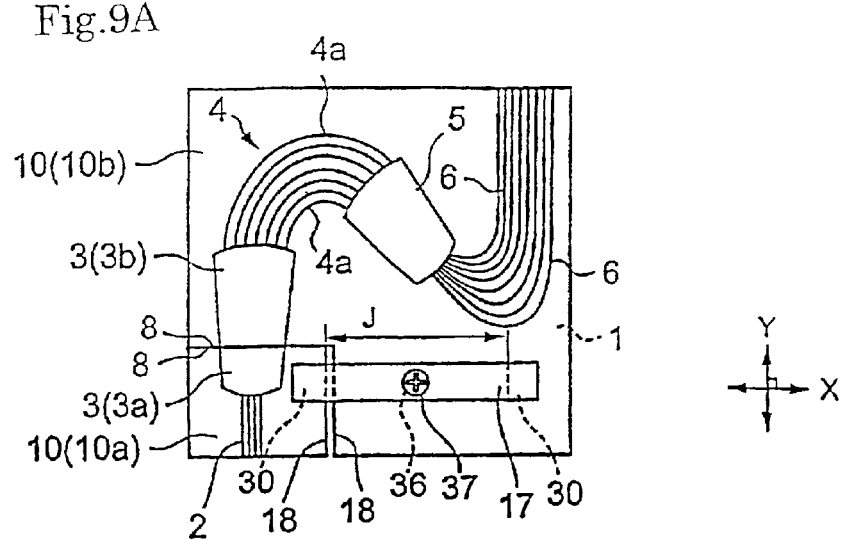
FIG. 9A is a plan view showing the construction of a main portion of another embodiment of the arrayed waveguide grating of the present invention.
Figure 9B:
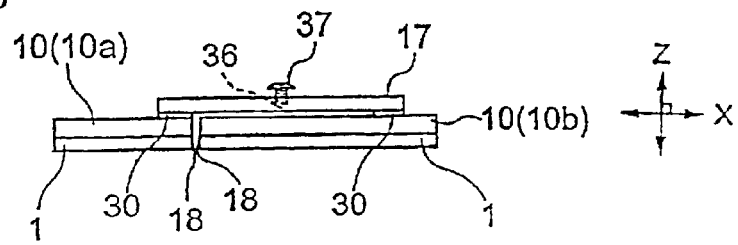
FIG. 9B is a side view showing this construction.
Figure 9C:
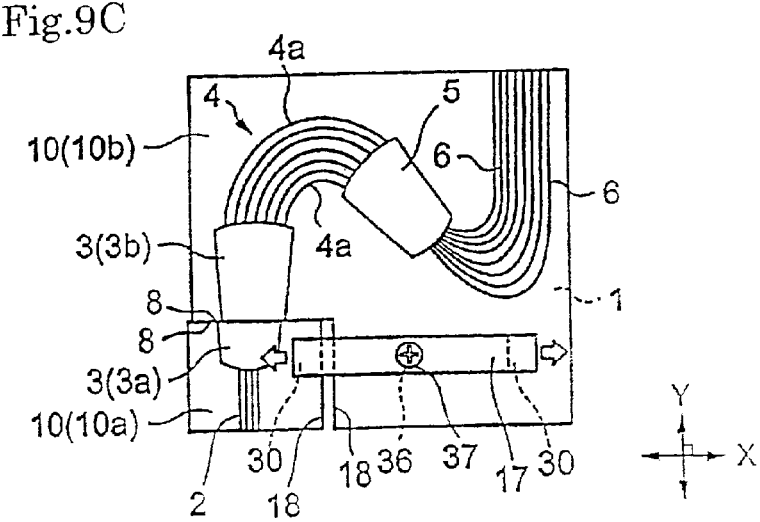
FIG. 9C is an explanatory view showing the plastic deformation operation of a slide moving member arranged in the embodiment shown in FIGS. 9A and 9B by a plan view.
Figure 9D:
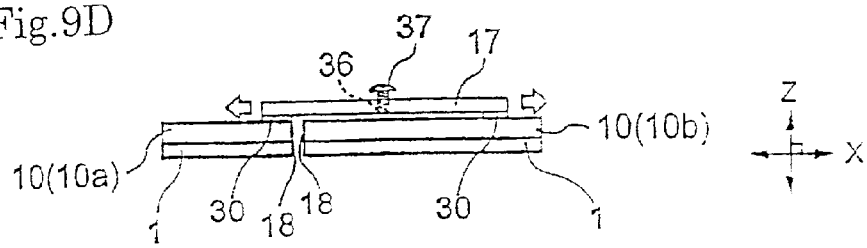
FIG. 9D is a side view showing this plastic deformation operation.
Figure 10:
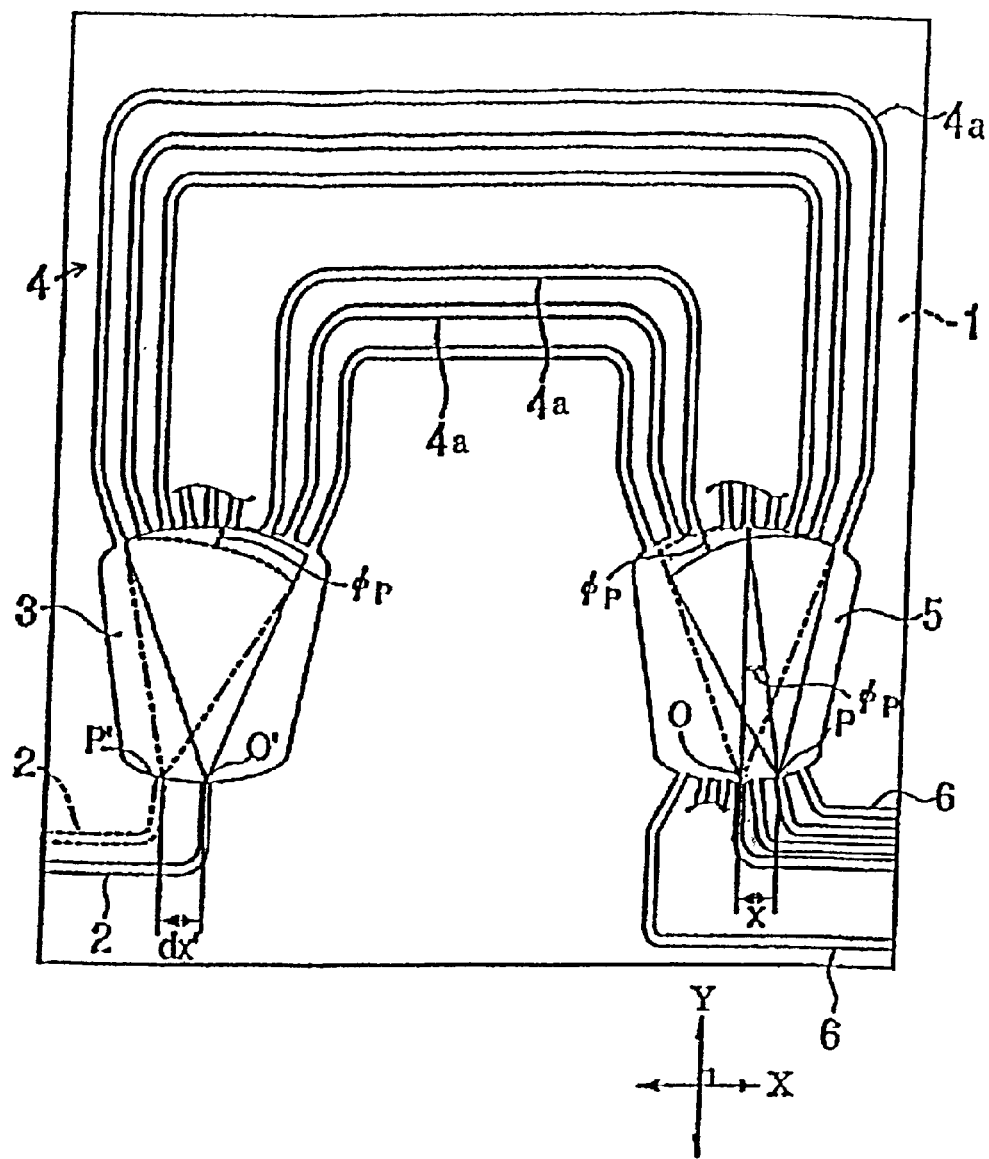
FIG. 10 is an explanatory view showing the relation of a center wavelength shift in the arrayed waveguide grating and the positions of an optical input waveguide and an optical output waveguide.
Figure 11:
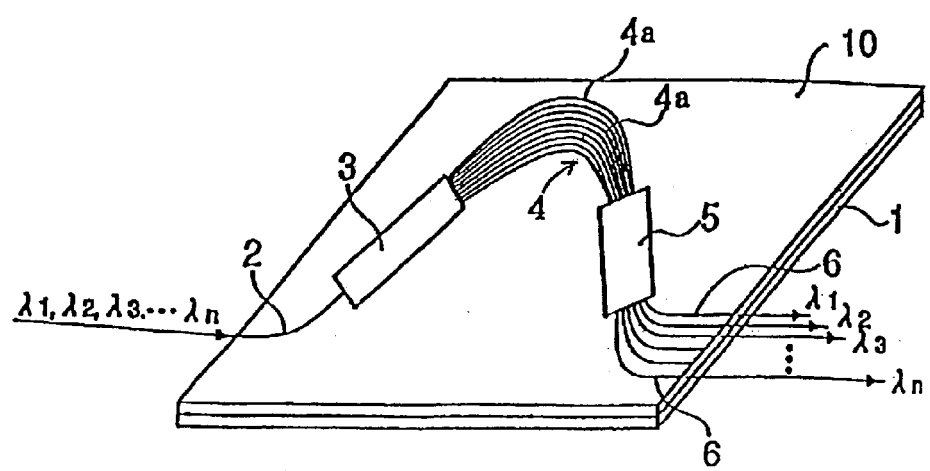
FIG. 11 is an explanatory view showing a conventional arrayed waveguide grating.
Figure 12A:
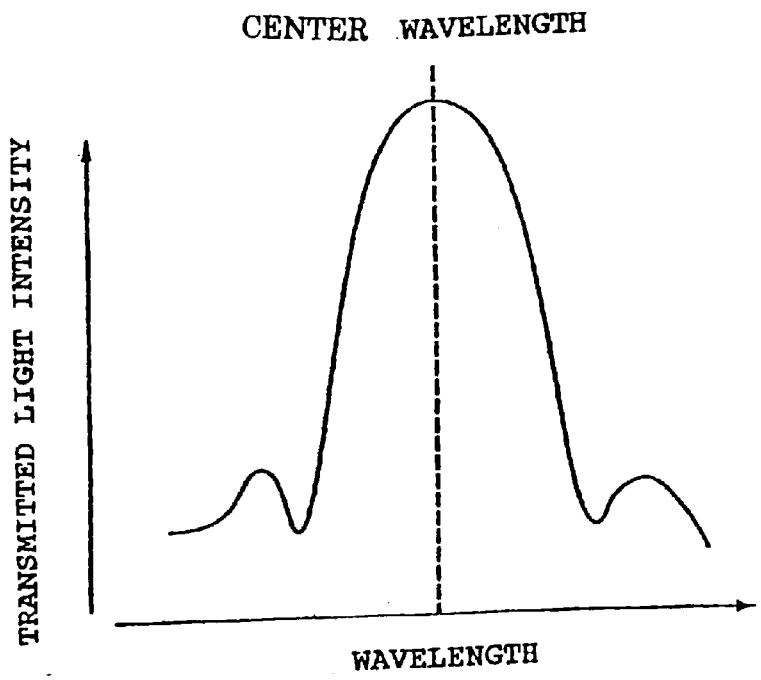
FIG. 12A is a graph showing an example of light transmitting characteristics of light outputted from one of the optical output waveguides of the arrayed waveguide grating.
Figure 12B:
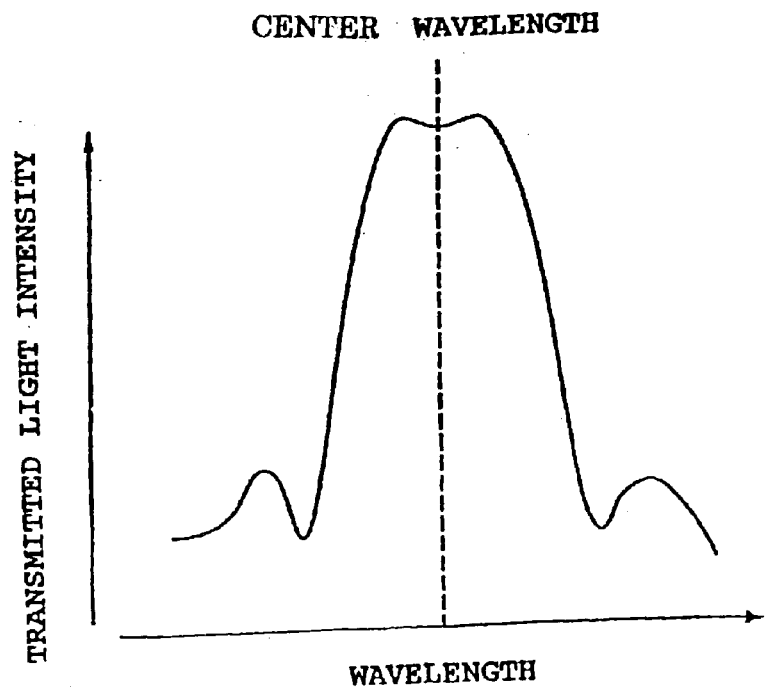
FIG. 12B is a graph showing another example of the light transmitting characteristics of the light outputted from one of the optical output waveguides of the arrayed waveguide grating.
Figure 13:
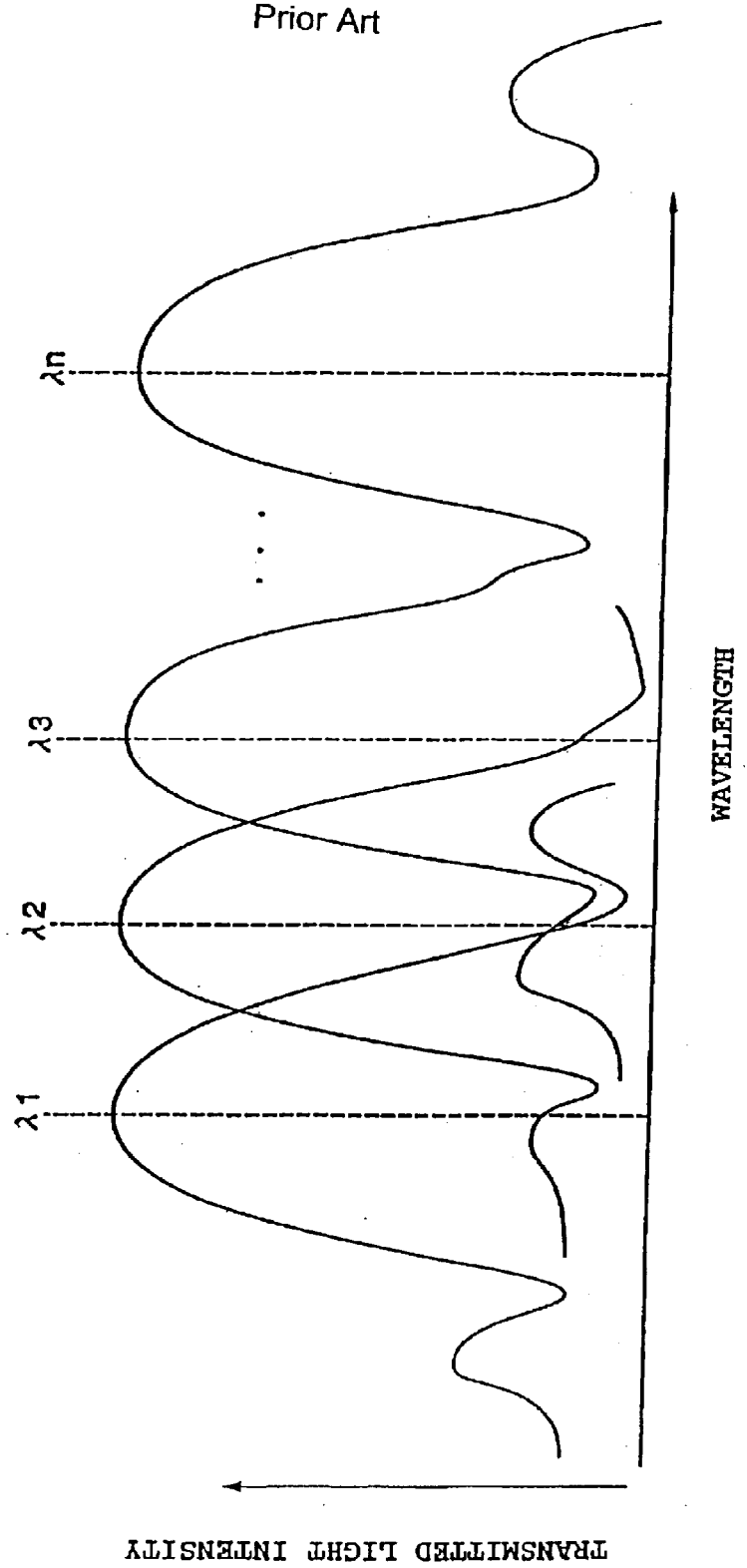
FIG. 13 is a graph overlapping and showing the light transmitting characteristics of light outputted from a plurality of optical output waveguides of the arrayed waveguide grating.
Figure 14:
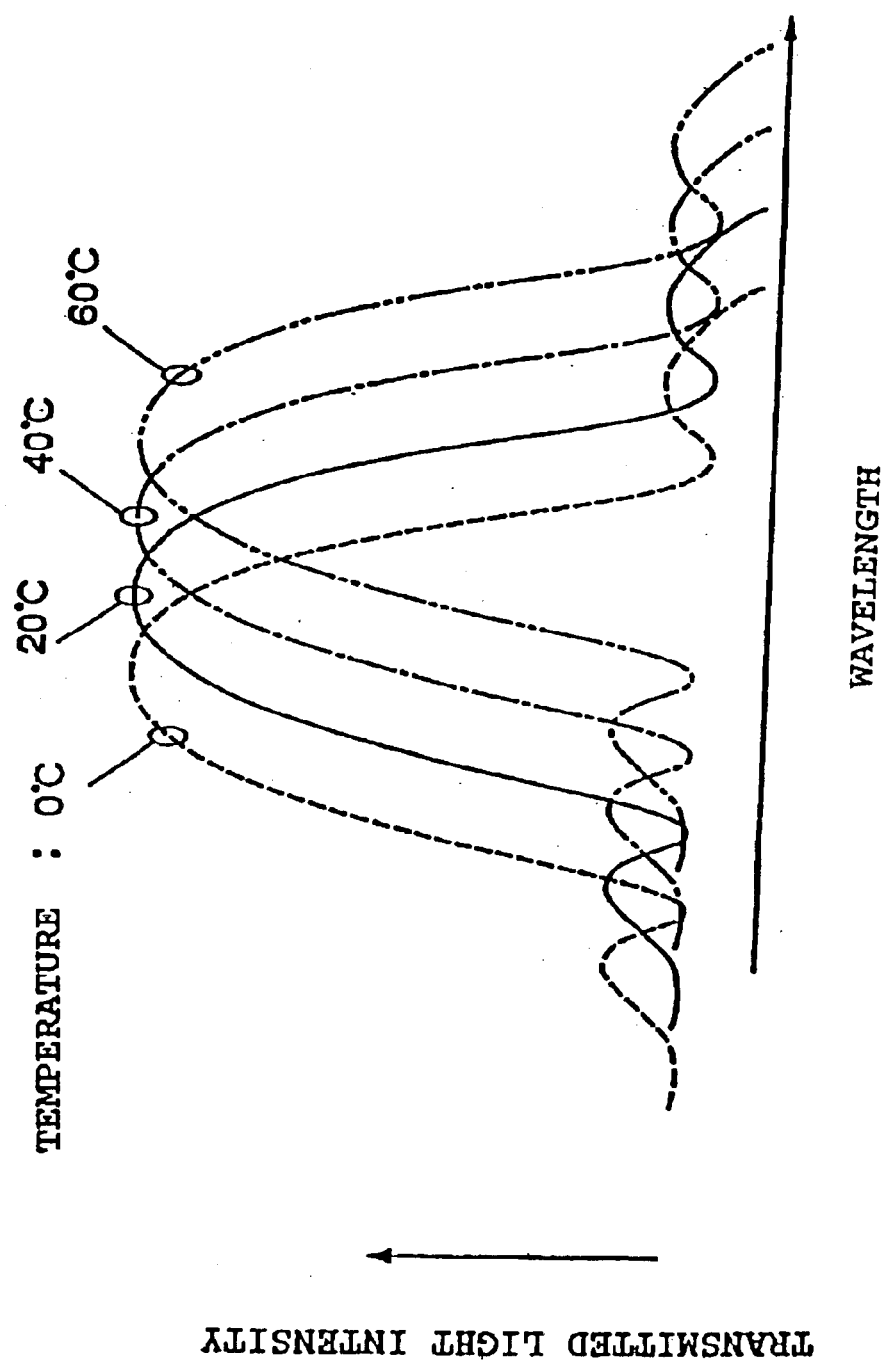
FIG. 14 is a graph showing an example in which the light transmitting characteristics of light outputted from one of the optical output waveguides of the arrayed waveguide grating are shifted by temperature.
Figure 15:
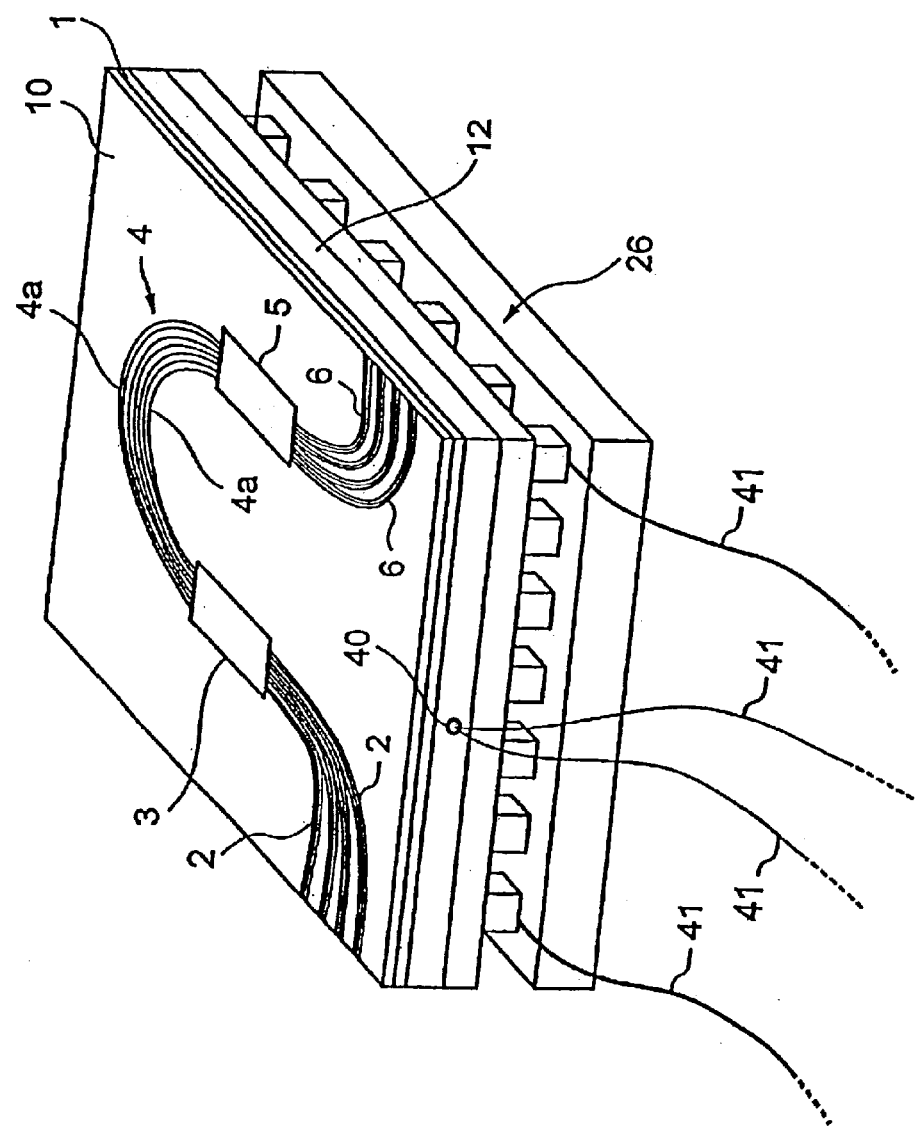
FIG. 15 is an explanatory view showing an arrayed waveguide grating constructed by arranging a conventional Peltier device.

Further, for example, as shown in FIGS. 8A and 8B, a hollow or a hole 34 may be also formed in the slide moving member 17 in a displacing area (an area shown by J in these figures) in the slide direction. As shown in FIGS. 8C and 8D, a wedge member 35 as a fitting member having a large insertion portion having a dimension larger than that of an opening of the above hollow or hole 34 may be also fitted into the above hollow or hole 34. In this case, the length of the slide moving member 17 is also set to the length for correcting the shift of the center wavelength of the arrayed waveguide grating from the set wavelength by fitting the wedge member 35 into the hollow or the hole 34. Thus, effects similar to those in the above first embodiment can be obtained.

In the construction shown by FIGS. 8C and 8D, no slide moving member 17 may be necessarily plastically deformed by deformation of the slide moving member 17 due to the fitting of the wedge member 35 into the hollow or the hole 34. Namely, the fitting of the wedge member 35 into the hollow or the hole 34 may be also set to a so-called elastic deforming range in which the length of the slide moving member 17 is returned to its original length when the wedge member 35 is detached from the hollow or the hole 34.

Further, the arrayed waveguide grating of the present invention may be, for example, also constructed as shown in FIGS. 9A, 9B, 9C and 9D. In this construction, a screw hole 36 as the hollow or the hole is formed in a displacing area (an area shown by J in FIG. 9A) in the sliding direction of the slide moving member 17, and a taper screw 37 as a fitting member is fitted into the screw hole 36. The taper screw 37 is a screw having a large diameter portion having a diameter larger than that of an opening of the screw hole 36, and reduced in diameter toward a tip side. In this case, similar effects can be also obtained by setting the length of the slide moving member 17 to the length for correcting the shift of the center wavelength of the arrayed waveguide grating from the set wavelength by fitting the taper screw 37 into the screw hole 36.

In this construction, the deformation of the slide moving member 17 due to the fitting of the taper screw 37 into the screw hole 36 may be also set to the above elastic deforming range. Further, in this construction, the fine adjustment of a deforming amount of the slide moving member 17 is very easily made by an insertion depth of the taper screw 37.

Further, in this construction, the length of the slide moving member 17 can be also lengthened and shortened by adjusting a fastening amount of the taper screw 37. Therefore, in this construction, the center wavelength can be slightly adjusted to a long wavelength side and a short wavelength side.

For example, the fastening amount of the above taper screw 37 is adjusted as follows. First, the slide moving member 17 is fixed to the arrayed waveguide grating in advance in a state in which the taper screw 37 is inserted until an intermediate portion of the screw hole 36. Thereafter, when it is desirous to correct the center wavelength of the arrayed waveguide grating to the short wavelength side, the length of the slide moving member 17 is lengthened by deepening the insertion depth of the taper screw 37 into the screw hole 36. In contrast to this, when it is desirous to correct the center wavelength of the arrayed waveguide grating to the long wavelength side, the length of the slide moving member 17 is shortened by shallowing the insertion depth of the taper screw 37 into the screw hole 36 and removing the taper screw 37.

Further, in the above second embodiment, the compression stress in the X-direction of FIG. 5C was applied to the slide moving member 17. However, in the construction of the second embodiment, for example, the length of the slide moving member 17 in the above slide moving direction can be also changed such that this length is lengthened by applying the compression stress in the Y-direction of FIG. 5C. The slide moving direction of the slide moving member 17 is the X-direction of FIGS. 5A and 5C.

As mentioned above, the deforming method of the slide moving member 17 is not particularly limited, but is suitably set. Namely, an important point is that the length of the slide moving member 17 is set to a length for correcting the shift of the center wavelength of the arrayed waveguide grating from the set wavelength by deforming the slide moving member 17 in the above slide moving direction. Effects similar to those in the above respective embodiments can be obtained in the arrayed waveguide grating in which this length of the slide moving member 17 is adjusted.

Further, as mentioned above, when the slide moving member 17 is deformed by various methods such as the plastic deformation, etc., it is preferable to deform the slide moving member 17 while the center wavelength of the arrayed waveguide grating is monitored. Namely, it is preferable to make a movement along the separating face of the separating slab waveguide by the slide moving member 17 such that the monitored center wavelength becomes the set wavelength.

Further, in the above respective embodiments, the first slab waveguide 3 is separated, but the second slab waveguide 5 may be also separated. Namely, since the arrayed waveguide grating is formed by utilizing reciprocity of light, effects similar to those in the above embodiments are obtained even when the second slab waveguide 5 is separated.

In this case, the slide moving member 17 is also plastically deformed. Thereafter, at least one side of the separated slab waveguide is slid and moved in a direction for reducing the temperature dependence change of the above each center wavelength along the above face by the slide moving member 17. Thus, effects similar to those in the above respective embodiments can be also obtained and the temperature dependence change of the above each center wavelength can be dissolved in the construction in which the second slab waveguide 5 is separated.

Further, the separating face (cross separating face) 8 of each of the first slab waveguide 3 or the second slab waveguide 5 is not limited to a face approximately parallel to the X-axis as in the above respective embodiments. The cross separating face 8 may be also set to a slanting face with respect to the X-axis. Namely, it is sufficient to set the cross separating face 8 to a face for separating the slab waveguide on a face crossing a path of light passing through the separated slab waveguide.

Further, in the above respective embodiments, the slide moving member 17 for sliding and moving a side of the separating slab waveguide 3a along the separating face 8 is arranged in a mode in which the slide moving member 17 lies across the first and second waveguide forming areas 10a, 10b. However, an arranging mode of the slide moving member 17 is not particularly limited, but is suitably set.

For example, a base of the arrayed waveguide grating is arranged, and the second waveguide forming area 10b is fixed to the base, and the first waveguide forming area 10a is set to be freely slid and moved with respect to the base. One end side of the slide moving member 17 is fixed to the base and the other end side is fixed to the first waveguide forming area 10a. The first waveguide forming area 10a may be also slid and moved along the above separating face 8 dependently on temperature by utilizing thermal expansion and contraction of the slide moving member 17.

In the above respective embodiments, the slide moving member 17 is formed by copper as a metal, but can be also formed by a metal except for copper. Further, the slide moving member 17 may be also formed by a material having a coefficient of thermal expansion larger than that of each of the substrate of the arrayed waveguide grating and the waveguide forming area except for the metal. However, since processing such as plastic deformation, etc. is easily performed with respect to the metal, there is an advantage in that the arrayed waveguide grating can be easily manufactured when the slide moving member 17 is formed by the metal.

Further, the slide moving member 17 may not be constructed such that the above separating slab waveguide is moved by utilizing expansion and contraction due to heat as mentioned above. For example, the separating slab waveguide can be also moved by fixing one end side of the slide moving member 17 to the separating slab waveguide, and arranging at least one of a mechanical moving means and an electric moving means for moving the above separating slab waveguide on the other end side of the slide moving member 17.

Further, the detailed values of equivalent refractive indexes of the respective waveguides 2, 3, 4a, 5, 6 constituting the arrayed waveguide grating of the present invention, the number of waveguides, sizes of the waveguides, etc. are not particularly limited, but are suitably set.

Industrial Applicability

As mentioned above, since the arrayed waveguide grating in the present invention can approximately set the center wavelength to the set wavelength at any temperature within e.g., a using temperature range, the arrayed waveguide grating is suitable for a light transmitting device for wavelength division multiplexing transmission.

What is claimed is:

1. An arrayed waveguide grating, comprising:
   a waveguide construction has at least one optical input waveguide, a first slab waveguide connected to an emitting side of at least one optical input waveguide, an arrayed waveguide connected to an emitting side of the first slab waveguide and constructed by a plurality of channel waveguides having lengths different from each other by set amounts and arranged side by side, a second slab waveguide connected to an emitting side of the arrayed waveguide, and a plurality of optical output waveguides arranged side by side and connected to an emitting side of the second slab waveguide;
   the waveguide construction is formed on a substrate;
   slab waveguides are formed by separating at least one of the first slab waveguide and the second slab waveguide on a crossing face crossing a path of light passing through the slab waveguide; and
   a slide moving member for reducing the temperature dependence of a center wavelength of the arrayed waveguide grating by sliding and moving at least one side of the separated separating slab waveguide along said separating face dependently on temperature is arranged, said slide moving member having an adjustment feature that enables the slide moving member to be physically deformed to set a length of the slide moving member to a length for correcting a shift of the center wavelength of the arrayed waveguide grating from a wavelength set during manufacture of the arrayed waveguide grating.

2. An arrayed waveguide grating according to claim 1, wherein the adjustment feature allows the slide moving member to be physically deformed by applying compression stress to the slide moving member.

3. An arrayed waveguide grating according to claim 1, wherein the adjustment feature allows the slide moving member to be physically deformed by applying tensile stress to the slide moving member.

4. An arrayed waveguide grating according to any one of claims 1 to 5, wherein the slide moving member is formed by a metal.

5. An arrayed waveguide grating, comprising;
   a waveguide construction is formed on a substrate such that a first slab waveguide is connected to an emitting side of at least one optical input waveguide, and an arrayed waveguide constructed by a plurality of channel waveguides for propagating light transmitted from the first slab waveguide and having lengths different from each other by set amounts and arranged side by side is connected to an emitting side of the first slab waveguide, and a second slab waveguide is connected to an emitting side of the arrayed waveguide, and a plurality of optical output waveguides arranged side by side are connected to an emitting side of the second slab waveguide;
   separating slab waveguides are formed by separating at least one of the first slab waveguide and the second slab waveguide on a crossing face crossing a path of light passing through the slab waveguide;
   a slide moving member for reducing the temperature dependence of a center wavelength of the arrayed waveguide grating by sliding and moving at least one side of the separated separating slab waveguides along said separating face dependently on temperature is arranged;
   a hollow or a hole is formed in a displacing area of the slide moving member in its sliding direction; and
   a length of said slide moving member is set to a length for correcting a shift of the center wavelength of the arrayed waveguide grating from a set wavelength by fitting a fitting member having a large insertion portion having a dimension larger than that of an opening of the hollow or the hole into said hollow or the hole.

6. An arrayed waveguide grating according to claim 5, wherein the fitting member is set to a taper screw reduced in diameter toward its tip side.

7. A method for correcting center wavelength of an arrayed waveguide grating, comprising:
   constructing a waveguide construction having at least one optical input waveguide, a first slab waveguide connected to an emitting side of the optical input waveguide, an arrayed waveguide connected to an emitting side of the first slab waveguide and constructed by a plurality of channel waveguides having lengths different from each other by set amounts and arranged side by side, a second slab waveguide connected to an emitting side of the arrayed waveguide, and a plurality of optical output waveguides arranged side by side and connected to an emitting side of the second slab waveguide;
   forming the waveguide construction on a substrate;
   forming separating slab waveguides by separating at least one of the first slab waveguide and the second slab waveguide on a crossing face crossing a path of light passing through the slab waveguide;
   providing a slide moving member for reducing the temperature dependence of a center wavelength of the arrayed waveguide grating by sliding and moving at least one side of the separated separating slab waveguides along said separating face dependently on temperature is arranged in the arrayed waveguide grating; and
   setting the center wavelength of the arrayed waveguide grating from a wavelength set during manufacture of the arrayed waveguide grating to a corrected wavelength by applying an external force with a tool in order to move at least one side of said separating slab waveguide along said separating face to plastically deform the slide moving member.

8. A method for correcting center wavelength of an arrayed waveguide grating according to claim 7, wherein the slide moving member is plastically deformed by applying compression stress to said slide moving member.

9. A method for correcting center wavelength of an arrayed waveguide grating according to claim 7, wherein the slide moving member is plastically deformed by applying tensile stress to the slide moving member.

10. A method for correcting center wavelength of an arrayed waveguide grating, comprising;

a waveguide construction has at least one optical input waveguide, a first slab waveguide connected to an emitting side of the optical input waveguide, an arrayed waveguide connected to an emitting side of the first slab waveguide and constructed by a plurality of channel waveguides having lengths different from each other by set amounts and arranged side by side, a second slab waveguide connected to an emitting side of the arrayed waveguide, and a plurality of optical output waveguides arranged side by side and connected to an emitting side of the second slab waveguide;

the waveguide construction is formed on a substrate;

separating slab waveguides are formed by separating at least one of the first slab waveguide and the second slab waveguide on a crossing face crossing a path of light passing through the slab waveguide;

a slide moving member for reducing the temperature dependence of a center wavelength of the arrayed waveguide grating by sliding and moving at least one side of the separated separating slab waveguides along the separating face dependently on temperature is arranged in the arrayed waveguide grating;

a hollow or a hole is formed in a displacing area of the slide moving member in its sliding direction; and a length of said slide moving member in the sliding direction is changed and at least one the of the separating slab waveguide is moved along the separating face by fitting a fitting member having a large insertion portion having a dimension larger than that of an opening of the hollow or the hole into said hollow or the hole so that the center wavelength of the arrayed waveguide grating is set to a set wavelength.

11. A method for correcting center wavelength of an arrayed waveguide grating according to any one of claims 7 to 10, wherein, while the center wavelength of the arrayed waveguide grating is monitored, a movement along the separating face of the separating slab waveguide is made by the slide moving member so as to set the monitored center wavelength to the set wavelength.

* * * * *